(12) United States Patent
Shimizu et al.

(10) Patent No.: US 7,636,631 B2
(45) Date of Patent: Dec. 22, 2009

(54) METHOD AND DEVICE FOR DETECTING POSITION OF MOBILE OBJECT, AND COMPUTER PRODUCT

(75) Inventors: Seiya Shimizu, Kawasaki (JP); Asako Kitaura, Kawasaki (JP); Masami Mizutani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 229 days.

(21) Appl. No.: 11/504,624

(22) Filed: Aug. 16, 2006

(65) Prior Publication Data

US 2007/0124060 A1    May 31, 2007

(30) Foreign Application Priority Data

Nov. 28, 2005    (JP) .............................. 2005-342623

(51) Int. Cl.
*G01C 21/00* (2006.01)
(52) U.S. Cl. ................. 701/207; 340/988; 701/214; 382/103; 382/106
(58) Field of Classification Search ................. 701/207, 701/208, 214; 340/988; 382/103, 104, 106, 382/107
See application file for complete search history.

(56) References Cited

U.S. PATENT DOCUMENTS 6,812,831 B2 * 11/2004 Ikeda .......................... 340/435
2003/0099377 A1 * 5/2003 Hanawa ....................... 382/104
2005/0225636 A1 * 10/2005 Maemura et al. ............ 348/148

FOREIGN PATENT DOCUMENTS

JP    2005-195493    7/2005

OTHER PUBLICATIONS

JP 1993-0182711 Translation.*

* cited by examiner

*Primary Examiner*—Thomas G Black
*Assistant Examiner*—Ce Li
(74) *Attorney, Agent, or Firm*—Fujitsu Patent Center

(57) ABSTRACT

The position detecting device includes a travel speed detecting unit, an optical flow calculating unit, a distance calculating unit, and a position detecting unit. The travel speed detecting unit detects a travel speed of a mobile object moving on an arbitrary route. The optical flow calculating unit calculates an optical flow of one side of the mobile object, based on a series of frame images of the one side. The one side is any one of a left side and a right side of the mobile object.

The distance calculating unit calculates a distance to a subject on the one side based on the travel speed and the optical flow. The position detecting unit detects a current position of the mobile object based on point data of the subject and the distance to the subject.

10 Claims, 16 Drawing Sheets

1203 AREA HAVING HIGH PROBABILITY OF ROAD BEING SHOT

METHOD AND DEVICE FOR DETECTING POSITION OF MOBILE OBJECT, AND COMPUTER PRODUCT

CROSS-REFERENCE TO RELATED APPLICATIONS

This application is based upon and claims the benefit of priority from the prior Japanese Patent Application No. 2005-342623, filed on Nov. 28, 2005, the entire contents of which are incorporated herein by reference.

BACKGROUND OF THE INVENTION

1. Field of the Invention

The present invention relates to a technology for detecting a current position of a mobile object based on a series of frame images of a left side and a right side of the mobile object.

2. Description of the Related Art

Conventionally, a navigation device installed in a mobile object such as a vehicle provides a navigation service to a driver by measuring a position of the vehicle using a global positioning system (GPS). GPS performs positioning based on an arrival time of a radio wave transmitted from an artificial satellite. GPS has a positioning accuracy of several meters to several tens of meters. Further increase in the positioning accuracy can be expected in the future due to positioning using radio wave phase differences such as real time kinematic-GPS (RTK-GPS), and launchings of Galileo by the European Union (EU) and a quasi-zenith satellite by Japan. Therefore, GPS will remain to be a mainstream method of vehicle positioning.

The positioning accuracy of GPS is sometimes significantly reduced due to an influence of multipath when the vehicle is in a location in which the radio wave from the artificial satellite is unstable, for example, when the vehicle is under elevated structures or between buildings. To eliminate the influence of multipath, a following position detecting device is proposed. The position detecting device stores information on a position and a height of a structure such as a building. Then, the position detecting device detects the position of the vehicle based on the radio wave from a GPS satellite. The position detecting device judges whether a structure is present on a straight line connecting the GPS satellite and the vehicle. If the structure is present, the position detecting device corrects the position of the vehicle considering radio wave reflection of the structure (for example, Japanese Patent Laid-Open Publication No. 2005-195493).

In addition, in recent years, to accurately determine a current position of the vehicle, many navigation devices employ a method of adjusting, using map-matching, the current position of the vehicle in road data to a position that is close to an actual current position. More specifically, map-matching correlates the current position of the vehicle with a road link that is closest to a positioning coordinate determined by GPS, among road links connecting each node point on map data. In addition, map-matching corrects a position of the vehicle in a traveling direction by determining a travel distance of the vehicle based on a circumference of a tire and a speed pulse output in accordance with a rotation of the tire.

However, according to map-matching explained above, a function of enhancing the positioning accuracy in the traveling direction of the vehicle regarding where the vehicle is located on the road link (or on a road link array), is not provided. Therefore, GPS errors in the traveling direction of the vehicle are not resolved. Furthermore, errors in the traveling direction are increased depending on the map-matching algorithm.

When the position is corrected using the speed pulse, the circumference of the tire is affected by air pressure, tire friction, and the like. Furthermore, the current position of the vehicle is measured by an addition of traveled distances. Therefore, the errors accumulate as the travel distance of the vehicle increases.

SUMMARY OF THE INVENTION

It is an object of the present invention to at least solve the above problems in the conventional technologies.

A position detecting device according to one aspect of the present invention includes a travel speed detecting unit, an optical flow calculating unit, a distance calculating unit, and a position detecting unit. The travel speed detecting unit detects a travel speed of a mobile object moving on an arbitrary route. The optical flow calculating unit calculates an optical flow of one side of the mobile object, based on a series of frame images of the one side. The one side is any one of a left side and a right side of the mobile object. The distance calculating unit calculates a distance to a subject on the one side based on the travel speed and the optical flow. The position detecting unit detects a current position of the mobile object based on point data of the subject and the distance to the subject.

A position detecting method according to another aspect of the present invention includes travel-speed-detecting, optical-flow-calculating, distance-calculating, and distance-calculating. At the travel-speed-detecting, a travel speed of a mobile object moving on an arbitrary route is detected. At the optical-flow-calculating, an optical flow of one side of the mobile object is calculated based on a series of frame images of the one side. The one side is any one of a left side and a right side of the mobile object. At the distance-calculating, a distance to a subject on the one side is calculated based on the travel speed and the optical flow. At the position-detecting, a current position of the mobile object is detected based on point data of the subject and the distance to the subject.

A computer-readable recording medium according to still another aspect of the present invention stores therein a computer program for detecting a position. The computer program causes a computer to execute travel-speed-detecting, optical-flow-calculating, distance-calculating, and distance-calculating. At the travel-speed-detecting, a travel speed of a mobile object moving on an arbitrary route is detected. At the optical-flow-calculating, an optical flow of one side of the mobile object is calculated based on a series of frame images of the one side. The one side is any one of a left side and a right side of the mobile object. At the distance-calculating, a distance to a subject on the one side is calculated based on the travel speed and the optical flow. At the position-detecting, a current position of the mobile object is detected based on point data of the subject and the distance to the subject.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail with reference to the accompanying drawings.

Figure 1:
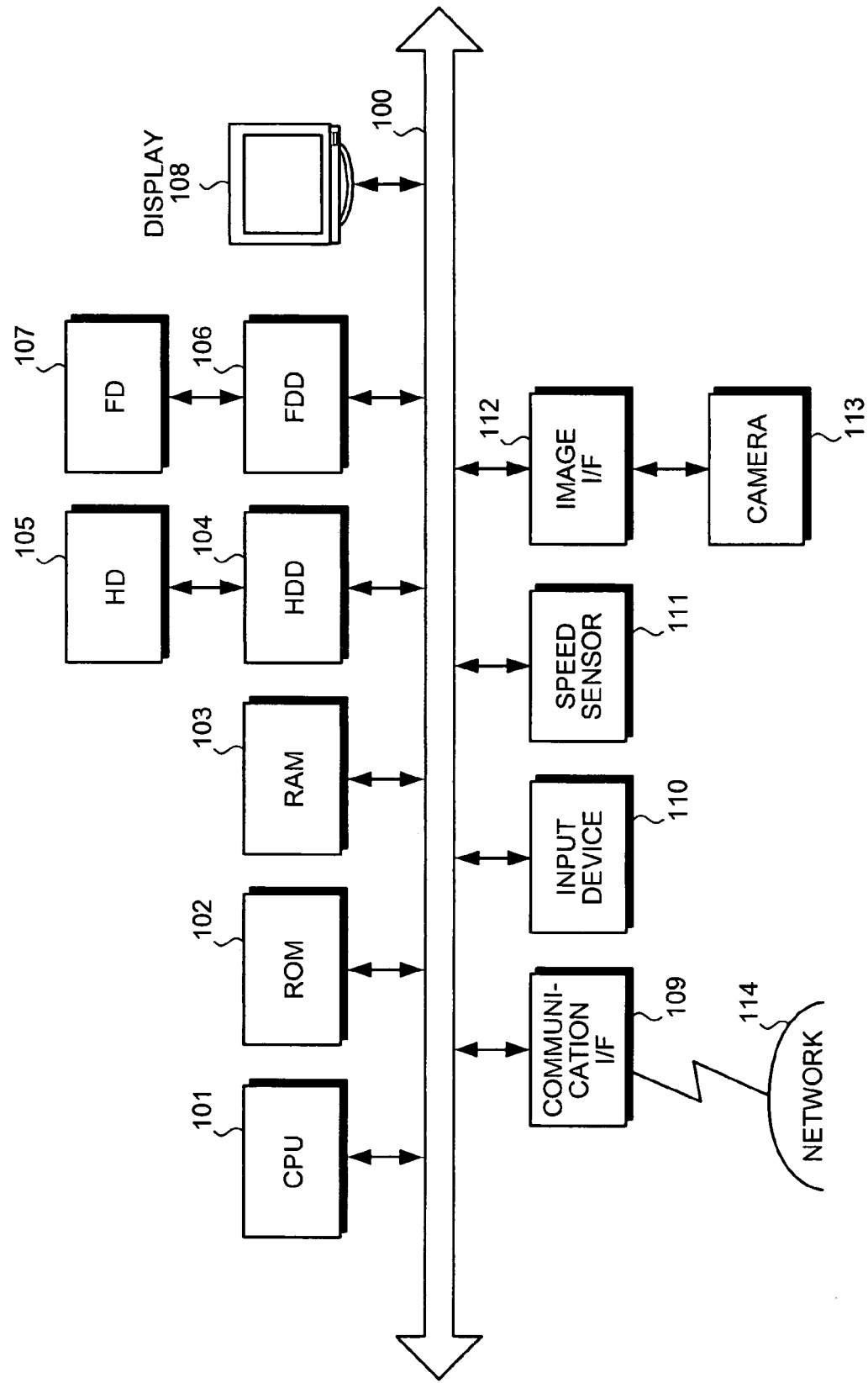
FIG. 1 is a schematic of a position detecting device according to a first embodiment of the present invention.

FIG. 1 is a schematic of a position detecting device according to a first embodiment of the present invention. The position detecting device includes a central processing unit (CPU) 101, a read-only memory (ROM) 102, a random access memory (RAM) 103, a hard disk drive (HDD) 104, a hard disk (HD) 105, a flexible disk drive (FDD) 106 as an example of a removable recording medium, a flexible disk (FD) 107, a display 108, a communication interface (I/F) 109, an input device 110, a speed sensor 111, an image I/F 112, and a camera 113. Each component is connected via a bus 100.

The CPU 101 controls the entire position detecting device. The ROM 102 stores programs such as a boot program. The RAM 103 is used as a work area of the CPU 101. The HDD 104 controls reading and writing of data from and to the HD 105 under the control of the CPU 101. The HD 105 stores the data that is written into the HD 105 under the control of the HDD 104.

The FDD 106 controls reading and writing of data from and to the FD 107 under the control of the CPU 101. The FD 107 stores the data that is written into the FD 107 under the control of the FDD 106. The data stored in the FD 107 is read by the position detecting device.

In addition to the FD 107, a compact-disc read-only memory (CD-ROM), a compact-disc recordable (CD-R), a compact-disc rewritable (CD-RW), a magneto-optical (MO) disk, a digital versatile disc (DVD), a memory card, and the like may be used as the removable recording medium. The display 108 displays data such as text, images, and function information in addition to a cursor, icons, and toolboxes. For example, a cathode-ray tube (CRT), a thin film transistor (TFT) liquid crystal display, or a plasma display may be used as the display 108.

The communication I/F 109 is connected to a network 114 such as the Internet via communication lines, and connected to other devices via the network 114. The communication I/F 109 controls an interface between the network 114 and the position detecting device and controls input and output of data to and from an external device. For example, a modem or a LAN adapter may be used as the communication I/F 109.

The input device 110 includes keys for inputting characters, numbers, various instructions, and the like. The input device 110 can also be a touch-panel-type input pad, a numeric keypad, or the like. A mouse or the like can be operated to move a cursor, select a range, move windows, change window size, and the like. The mouse can also be a track ball, a joystick, or the like having a similar function as a pointing device.

The speed sensor 111 detects a speed of a mobile object such as a vehicle, and inputs the detected speed into the position detecting device. The speed sensor 111 can include a speed pulse generator that generates a pulse for every rotation of a wheel, and a counter, so that the speed sensor 111 can detect a travel speed by calculating a travel distance per unit time based on tire rotation frequency and tire circumference. Furthermore, the speed sensor 111 can detect the travel speed from an output shaft of a transmission of the vehicle, or based on acceleration of the vehicle.

The image I/F 112 is connected to the camera 113. The image I/F 112 includes a control integrated circuit (IC) that controls the entire camera 113, a buffer memory such as a video RAM (VRAM) and the like that temporarily records frame images shot by the camera 113. The buffer memory can include plural frame buffers. For example, the frame images shot by the camera 113 (described later) can be alternately stored in two frame buffers. A frame buffer can be a two-dimensional memory. The frame buffer can store each picture element (pixel) of the frame image as 8-bit 256-gradation data (refer to FIG. 8). The frame buffer can control input and output of the frame images shot by the camera 113 to and from respective components of the position detecting device.

The camera 113 shoots a subject and loads shot images as a consecutive series of frame images. When the camera 113 is installed in the mobile object such as the vehicle, the camera 113 can shoot spatial objects such as surrounding topographic features and objects, as the subject. In the present specifications, the spatial objects include ground objects such as buildings and ground of a roadside viewed from the mobile object. The camera 113 can shoot images in monochrome or in color. The camera 113 includes a video camera or the like, and has a photoelectric conversion element such as a complementary metal oxide semiconductor (C-MOS) or a charge coupled device (CCD).

The camera 113 is connected to the image I/F 112 via a universal serial bus (USB) or an institute of electrical and electronics engineers 1394 (IEEE 1394), and successively outputs the shot frame images to the position detecting device via the image I/F 112.

Figure 2:
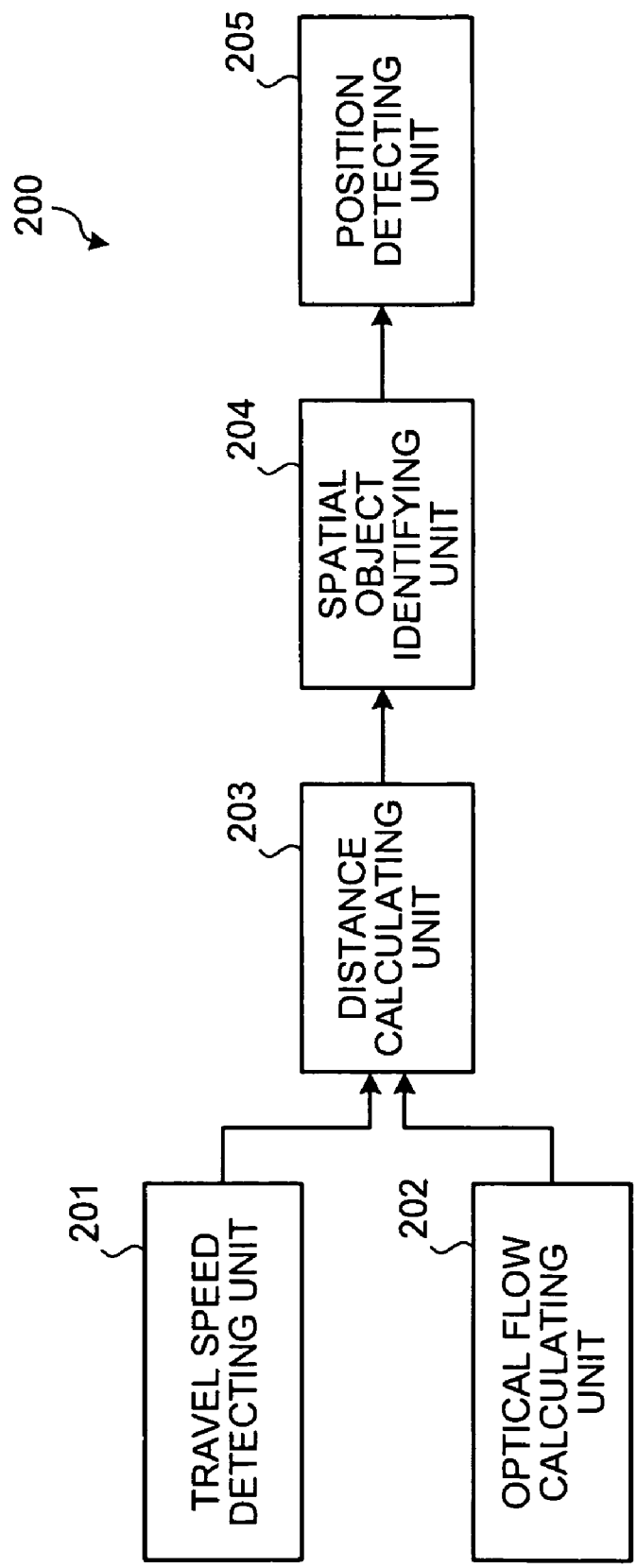
FIG. 2 is a block diagram of the position detecting device.

FIG. 2 is a block diagram of the position detecting device. A position detecting device 200 includes a travel speed detecting unit 201, an optical flow calculating unit 202, a distance calculating unit 203, a spatial object identifying unit 204, and a position detecting unit 205.

The travel speed detecting unit 201 detects a travel speed of the mobile object traveling on an arbitrary route. The travel speed detecting unit 201 may include, for example, the speed sensor 111, and detect the travel speed based on the tire rotation frequency and the tire circumference, or from the output shaft of the transmission. Furthermore, the travel speed detecting unit 201 may detect acceleration from an acceleration sensor or the like to calculate the travel speed.

Based on a series of frame images from any one of a right side and a left side of the mobile object on the arbitrary route, the optical flow calculating unit 202 calculates an optical flow of the one side of the mobile object. The series of frame images is, for example, shot by the camera 113 installed in a direction for shooting images of a side of the vehicle. The installation of the camera 113 will be explained in FIG. 4. The optical flow can, for example, be calculated for an arbitrary position in a traveling direction of the vehicle within a frame of the frame images shot by the camera 113. A calculation of the optical flow will be explained in detail with reference to FIGS. 5A to 10.

The distance calculating unit 203 calculates a distance to a subject on one side of the mobile object based on the travel speed detected by the travel speed detecting unit 201 and the optical flow calculated by the optical flow calculating unit 202. Although a calculation of a distance D to the subject will be explained with reference to FIG. 7, the distance D can be calculated using an amount of an optical flow $O_F$, a velocity V, a focal distance f of the camera 113, and a frame rate F of the shot frame images.

The spatial object identifying unit 204 identifies a spatial object that is the subject based on the distance calculated by the distance calculating unit 203. The spatial object is a topographic feature or an object including structures such as buildings and traffic lights, road configurations such as intersections and T-intersections, and the like. The identification of the spatial object is to identify the spatial object that is the subject based on, for example, a correlation between a movement of the car and the distance D to the subject in the frame image shot by the camera 113. More specifically, for example, a predetermined rule to identify the spatial object as an intersection can be provided, so that the spatial object can be identified as an intersection when a frame image is shot in which the distance D to the object increases smoothly along the traveling direction of the car and the distance D to the object equal to or more than a fixed distance (for example, 30 meters) continues for equal to or more than a fixed distance in the traveling direction of the car (for example, six meters).

The position detecting unit 205 detects a current position of the mobile object based on point data of the spatial object identified by the spatial object identifying unit 204 and the distance D to the subject. The point data of the spatial object can be, for example, a coordinate value. The current position of the vehicle is detected at a distance of the distance D to the subject from the point data.

Figure 3:
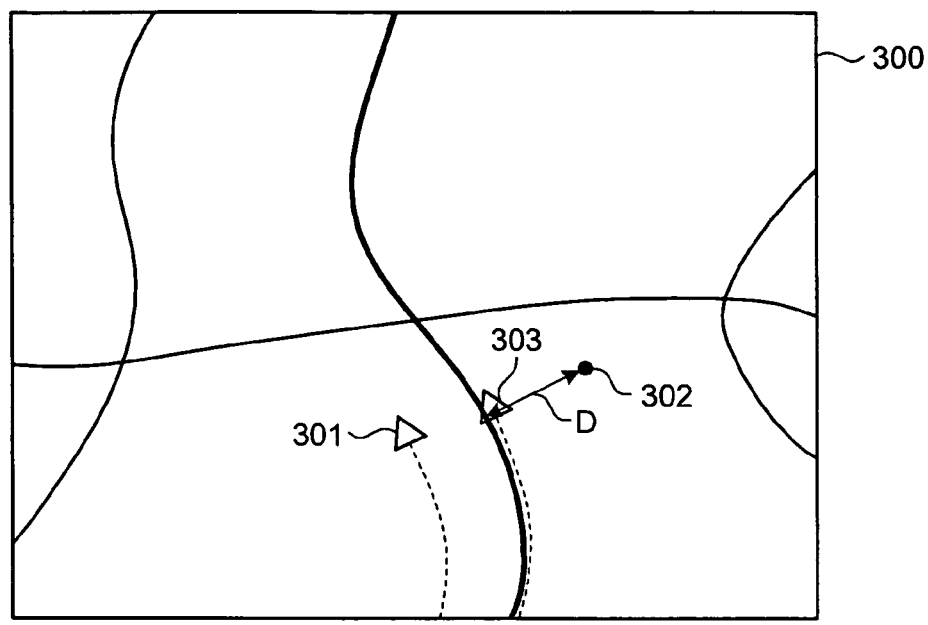
FIG. 3 is a schematic for illustrating detection of a current position of a vehicle performed by a position detecting unit.

FIG. 3 is a schematic for illustrating detection of the current position of the vehicle performed by the position detecting unit. A traveling position 301 of the vehicle, point data 302 of a spatial object, and the distance D to the subject are indicated in map data 300. The distance calculating unit 203 calculates the distance D to the subject. The position detecting unit 205 detects the position of the running vehicle as the current position 303 that is at a distance of the distance D to the subject calculated by the distance calculating unit 203 from the point data 302 of the spatial object identified by the spatial object identifying unit 204 as a starting point. In other words, the traveling position 301 of the vehicle is map-matched based on the point data 302 and the distance D to the subject, and becomes the current position 303.

Specifically, the travel speed detecting unit 201, the optical flow calculating unit 202, the distance calculating unit 203, the spatial object identifying unit 204, and the position detecting unit 205 can be realized by the CPU 101 that executes a program stored in the recording medium such as the ROM 102, the RAM 103, or the HD 105 shown in FIG. 1, or by the communication I/F 109 or the image I/F 112.

Figure 4:
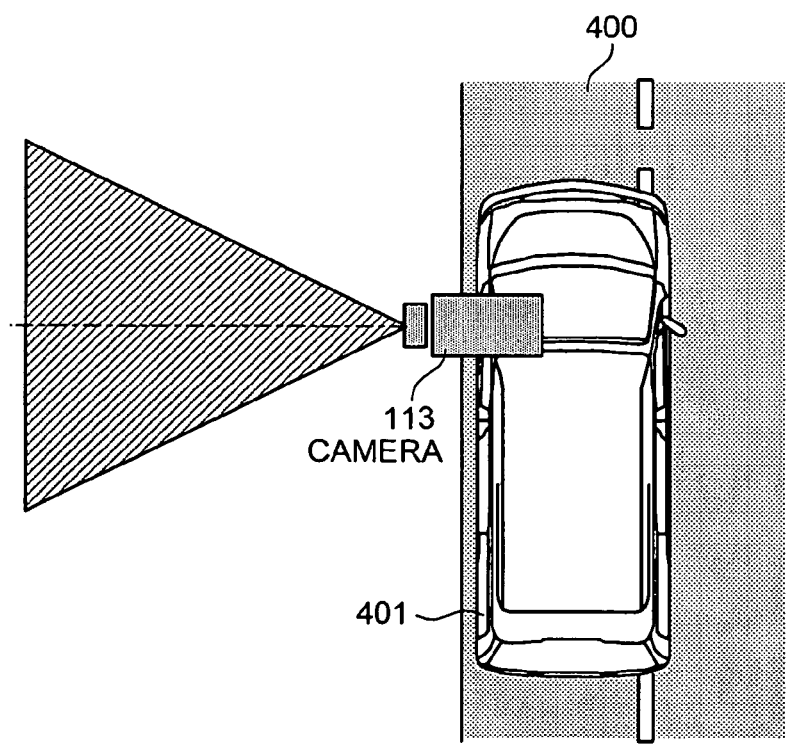
FIG. 4 is a schematic for illustrating an installation of a camera.

FIG. 4 is a schematic for illustrating an installation of the camera 113. The camera 113 is installed in a vehicle 401 traveling on an arbitrary route 400.

The camera 113 is installed in a direction for shooting from a side of the vehicle 401. The installation is not limited to either the left side or the right side of the vehicle 401. The camera 113 can shoot images in monochrome or in color, and includes a video camera or the like. The camera 113 consecutively shoots side images in an interval of several tens of frames per second. The number of frames shot per unit time is the frame rate F described above.

Figure 5A:
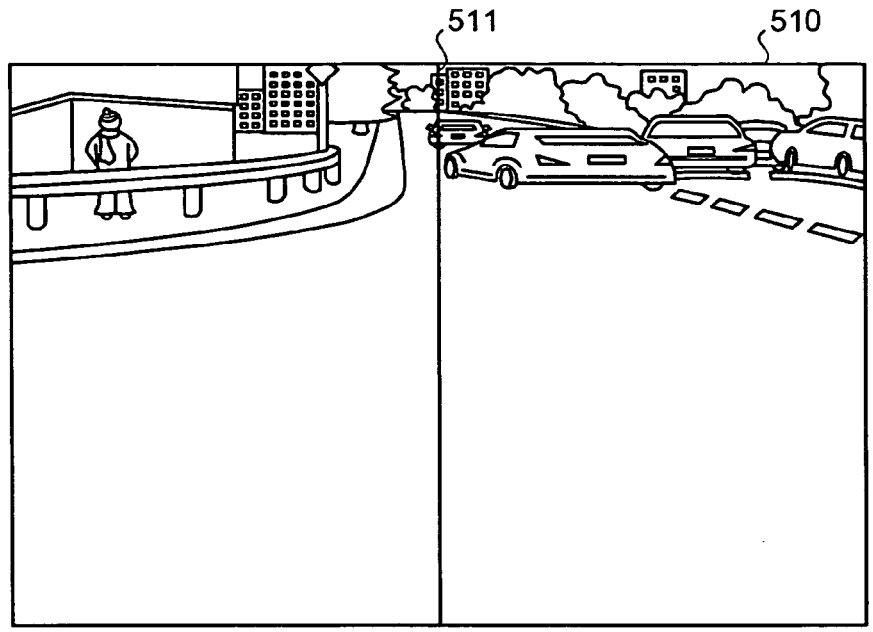
FIG. 5A is a schematic of a frame image of a (n−1) frame.
Figure 5B:
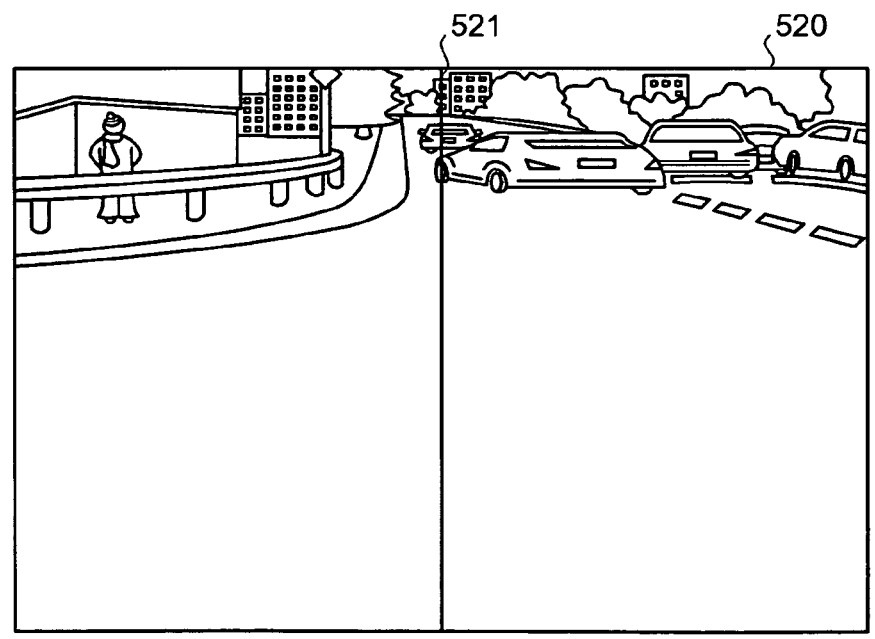
FIG. 5B is a schematic of a frame image of a (n) frame.

FIG. 5A is a schematic of a frame image of an (n−1) frame. FIG. 5B is a schematic of a frame image of an (n) frame. A frame image 510 of the (n−1) frame and a frame image 520 of the (n) frame are two temporally adjacent frame images. The frame images 510, 520 have vertical lines 511, 521 in the center of the image, respectively. The frame image 510 and the frame image 520 are shot by the camera 113 and are alternately stored in two frame buffers.

Figure 6:
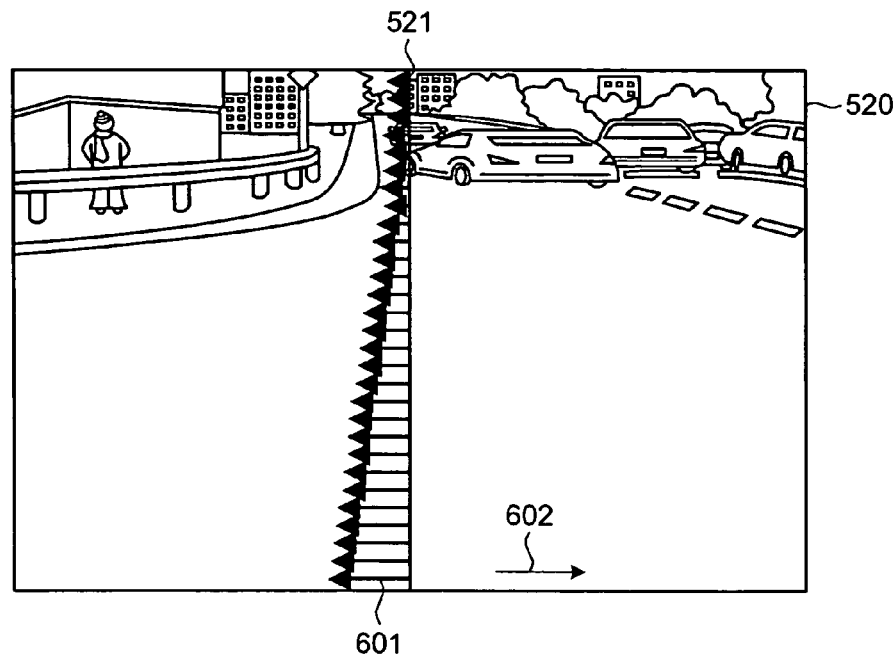
FIG. 6 is a schematic for illustrating an optical flow between the (n−1) frame and the (n) frame.

FIG. 6 is a schematic for illustrating an optical flow between the (n−1) frame and the (n) frame. An optical flow 601 of each point on the vertical line 521 in the frame image 520 of the (n) frame is measured in the traveling direction 602 of the vehicle.

When the vehicle is moving, the optical flow 601 includes only elements that are almost parallel to the traveling direction 602 between the (n−1) frame and the (n) frame. The optical flow 601 is that of an arbitrary position within the frame image 520. In the case of FIG. 6, the optical flow 601 of each point on the vertical line 521 that is perpendicular to the traveling direction 602 of the vehicle 401 is measured. The optical flow 601 can be determined using an image correlation between each frame and a previous frame of each frame (refer to FIG. 10).

Figure 7:
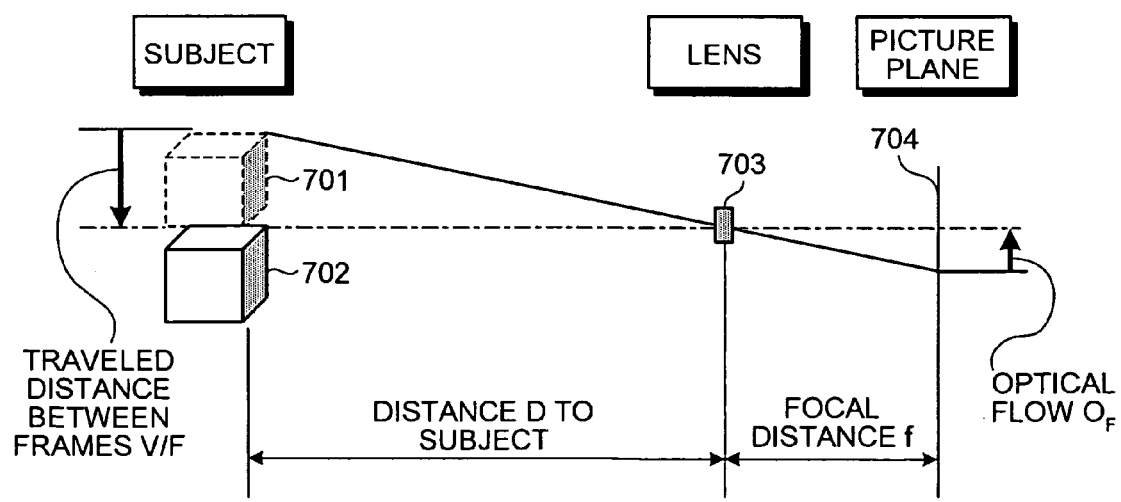
FIG. 7 is a schematic for illustrating a calculation of a distance to a subject.

FIG. 7 is a schematic for illustrating a calculation of a distance to the subject. A traveled distance between a subject 701 in the (n−1) frame and a subject 702 in the (n) frame can be V/F using the velocity V and the frame rate F of the shot images. The frame rate F is the number of frames shot per unit of time. 30 frames can be shot per second.

The focal distance f is a distance from a lens 703 of the camera 113 to a picture plane 704. The distance D to the subject 702 in the (n) frame can be expressed by a following equation (1) using the optical flow $O_F$, the traveled distance between frames V/F, and the focal distance f.

$$D = \frac{f \times V}{F \times O_F} \quad (1)$$

Figure 8:
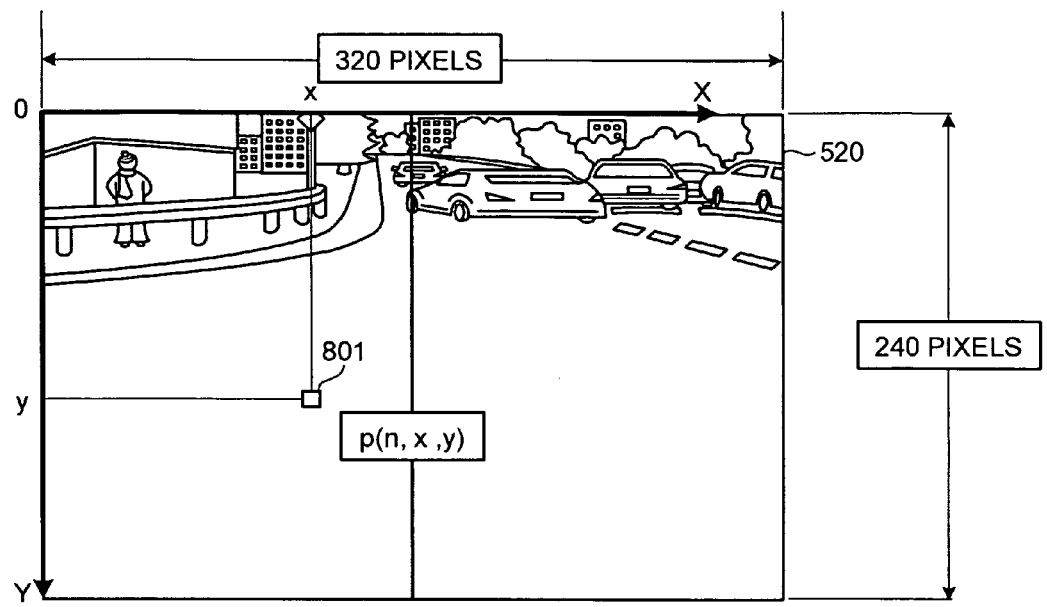
FIG. 8 is a schematic of a frame image of the (n) frame stored in a frame buffer.

FIG. 8 is a schematic of the frame image of the (n) frame stored in the frame buffer. The frame image 520 has 320 pixels in a direction of a horizontal axis (X) and 240 pixels in a direction of a vertical axis (Y), and is stored in the frame buffer of the image I/F 112. The frame buffer is a two-dimensional memory, and stores each pixel value as 8-bit, 256-gradation data p(n, x, y) 801, where n is a frame number, x is a value of the horizontal axis (X), and y is a value of the vertical axis (Y).

Figure 9:
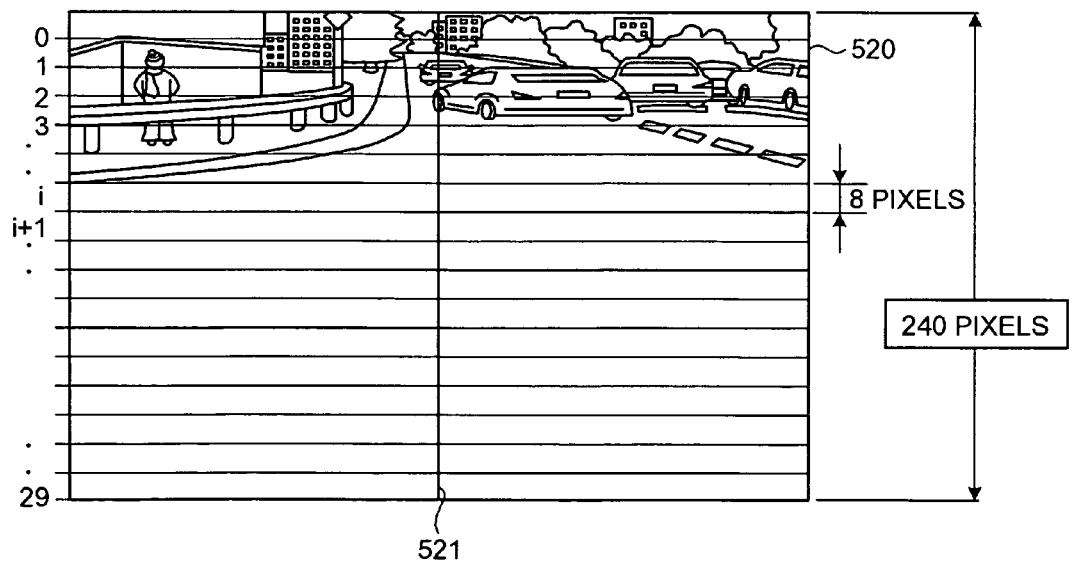
FIG. 9 is a schematic for illustrating a division of the frame image into vertical 8-pixel units on a vertical line.

FIG. 9 is a schematic for illustrating a division of the frame image into vertical 8-pixel units on the vertical line. The optical flow calculating unit 202 references the frame image 520 stored in the frame buffer and calculates the optical flow in vertical 8-pixel units on the vertical line 521 in the center of the frame image 520. In other words, the optical flow calculating unit 202 divides the 240 pixels in the vertical direction (Y) into blocks of 8 pixels and calculates 30 optical flows. The frame image can be divided into blocks having a height of 8-pixel by, for example, a division using i lines (for one pixel), where i is an integer (i=0 to 29).

Figure 10:
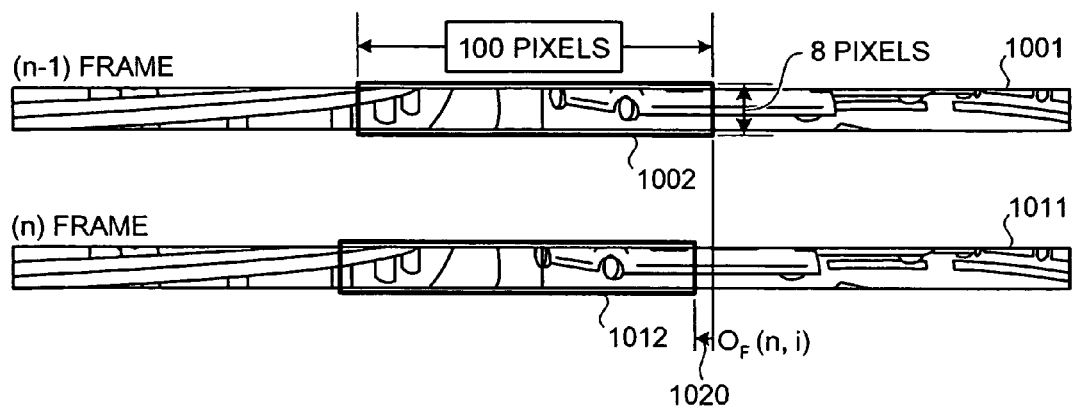
FIG. 10 is a schematic for illustrating a calculation of the optical flow.

FIG. 10 is a schematic for illustrating a calculation of the optical flow. FIG. 10 is a schematic of areas having a height of 8 pixels that are respectively i-th from the top cut out from the frame images of the consecutive (n−1) frame and the (n) frame. The cut-out i-th area having the height of 8 pixels is, for example, cut out from a (8×i) line to a (8×(i+1)−1) line. A cut-out area 1001 of the frame image of the (n−1) frame and a cut-out area 1011 of the frame image of the (n) frame are shown in FIG. 10.

The optical flow calculating unit 202 regards 100 horizontal pixels×8 vertical pixels near the center of the frame image of the (n−1) frame as a first template area 1002. The optical flow calculating unit 202 retrieves an area most similar to the first template area 1002 from the frame images of the (n) frame and sets the retrieved image as a second template area 1012. The traveled distance between the first template area 1002 and the second template area 1012 is an optical flow $O_F(n, i)$ 1020 of a center position.

The area most similar to the first template area 1002 can be retrieved while changing each value of the optical flow $O_F(n, i)$ 1020 that fulfills an equation (2) below. The vehicle is moving horizontally at this time, and therefore, vertical elements are not considered.

$$\sum_{y=8i}^{8(i+1)-1} \sum_{x=130}^{229} |p(n-1, x, y) - p(n, x - O_F(n, i)y)| \to \min \quad (2)$$

The distance calculating unit 203 can calculate a distance D(n, i) to the subject using the optical flow $O_F(n, i)$ 1020 according to the equation (2) above. More specifically, the distance to the subject at a position i in the (n) frame can be calculated using a following equation (3) based on the equation (1) described above.

$$D(n, i) = \frac{f \times V(n)}{F \times O_F(n, i)} \quad (3)$$

Figure 11:
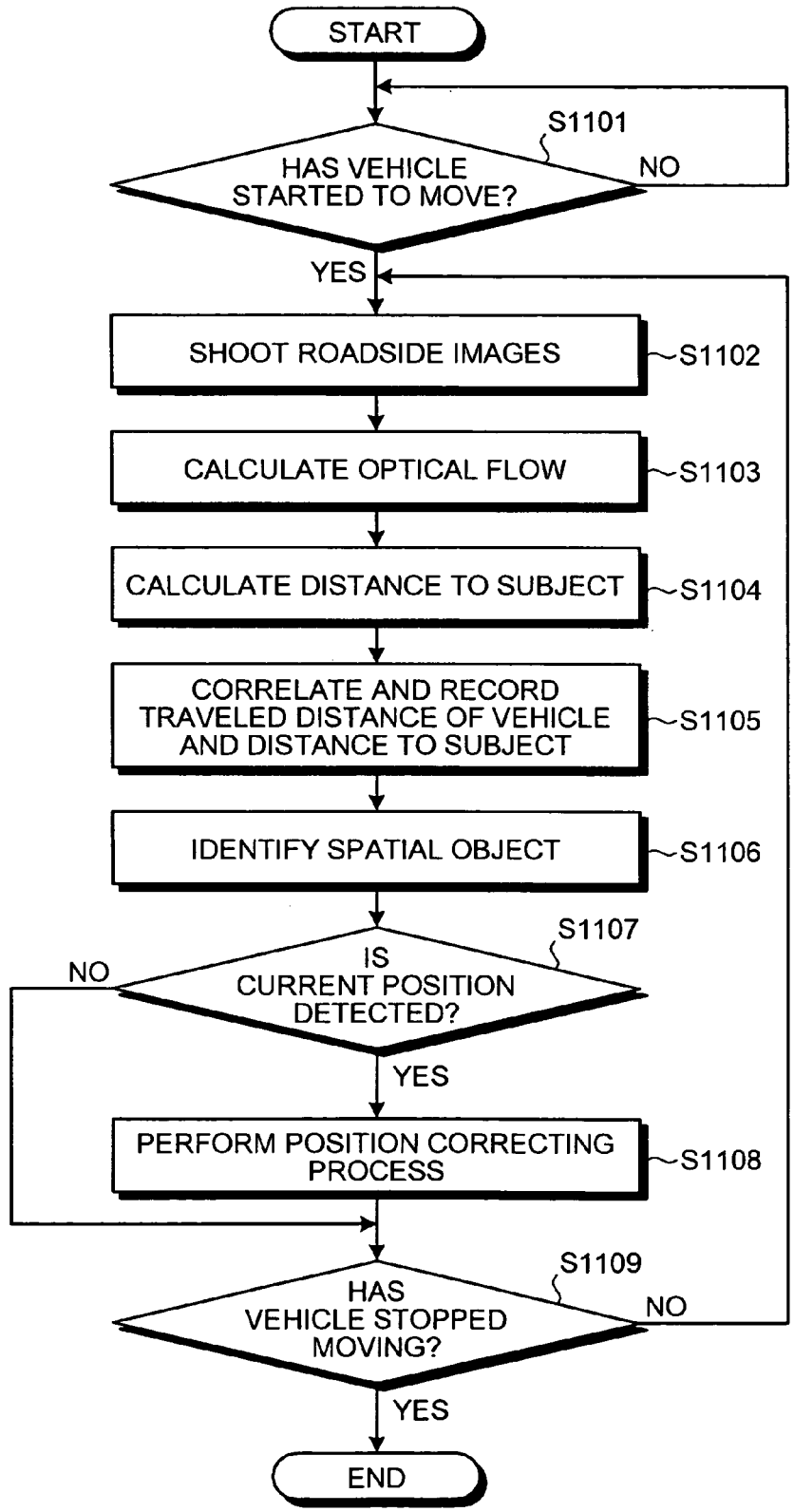
FIG. 11 is a flowchart of processes performed by the position detecting device.

FIG. 11 is a flowchart of processes performed by the position detecting device. The position detecting device 200 judges whether the vehicle 401 has started to move (step S1101). The position detecting device 200 can judge whether the vehicle 401 has started to move based on, for example, a state of an engine key or an output from the speed sensor 111. When the vehicle is moving (step S1101: YES), the image I/F 112 controls the camera 113 and shoots roadside images from the vehicle 401 (step S1102).

The roadside images shot at step S1102 are alternately stored in two frame buffers. Each pixel in each frame image is stored as 8-bit, 256-gradation data. The optical flow calculating unit 202 calculates an optical flow based on the frame images stored in the frame buffers (step S1103). The optical flow calculating unit 202 can calculate the optical flow, for example, by calculating 30 optical flows on the vertical line in the center of the frame image between consecutive frame images. In the explanation of FIG. 11, the i-th optical flow from the top of the n-th frame is represented as $O_F(n, i)$ 1020, as described in FIGS. 8 to 10.

Then, the distance calculating unit 203 calculates a distance to the subject based on the travel speed of the vehicle detected by the travel speed detecting unit 201 and the optical flow $O_F(n, i)$ 1020 calculated at step S1103 (step S1104). The distance to the subject can be calculated, for example, as D(n, i) using the equation (2). In addition to the calculation of the distance D(n, i) to the subject, a traveled distance d(n) of the vehicle 401 from the previous (n−1) frame is calculated using a following equation (4).

$$d(n) = \frac{V(n)}{F} \quad (4)$$

Then, the CPU 101 controls the HDD 104 and the like, and correlates and records the traveled distance of the vehicle 401 calculated at step S1104 and the distance to the subject (step S1105). At step S1105, for example, all 30 calculated distances D(n, i) to the subject and all inputs of the traveled distances d(n) between frame images can be recorded. Alternatively, the distance D and the traveled distances can be recorded in a first-in first-out (FIFO) buffer that records only a limited amount of information or the like, and deleted after a certain distance is traveled.

Then, the spatial object identifying unit 204 identifies the spatial object based on the distance D(n, i) to the subject recorded at step S1105 and the travel distance d(n) between the frame images (step S1106). The spatial object is a topographic feature or an object including structures such as buildings and traffic lights, road configurations such as intersections and T-intersections, and the like. The identification of the spatial object is to identify a spatial object that is the subject. For example, the spatial object can be identified based on past distance records. More specifically, for example, a predetermined rule for identifying the spatial object as an intersection can be provided, so that the spatial object can be identified as an intersection when a frame image is shot in which distance to a subject increases smoothly along the traveling direction of the car and the distance to a subject equal to or more than a fixed distance (for example, 30 meters) continues for a distance equal to or more than a fixed distance in the traveling direction of the car (for example, six meters).

Then, the position detecting unit 205 judges whether a current position of the vehicle 401 is detected based on the point data of the spatial object identified at step S1106 and the distance D(n, i) to the subject (step S1107). When the current position is detected (step S1107: YES), a position correcting process is performed on the current position of the vehicle 401 (step S1108). When the current position is not detected (step S1107: NO), the process proceeds to step S1109, and the position detecting device 200 judges whether the vehicle 401 has stopped moving (step S1109).

The position correcting process at step S1108 is performed, for example, by outputting a result detected at step S1107 to a car navigation device or the like (not shown) via the communication I/F 109 to correct the current position of the vehicle. In the position correcting process performed by the car navigation device or the like, for example, the current position of the vehicle 401 estimated by GPS, the speed sensor, or the like is changed into a position suited for the current position detected at step S1107.

Then, the position detecting device 200 judges whether the vehicle 401 has stopped moving (step S1109). The position detecting device 200 can judge whether the vehicle 401 has stopped moving based on, for example, a state of the engine key or an output from the speed sensor 111. If the vehicle 401 has not stopped moving (step S1109: NO), the processes are continued from step S1102. If the vehicle has stopped moving (step S1109: YES), a series of processes is finished.

The identification of the spatial object at step S1106, particularly when the intersection is judged, will be explained. The judgment of the intersection is not limited to the following. For example, first, an area having a high probability of a road surface being shot is set in advance in setting conditions of the camera 113. The area having the high probability of the road surface being shot will be explained in further detail, with reference to FIG. 12.

Figure 12:
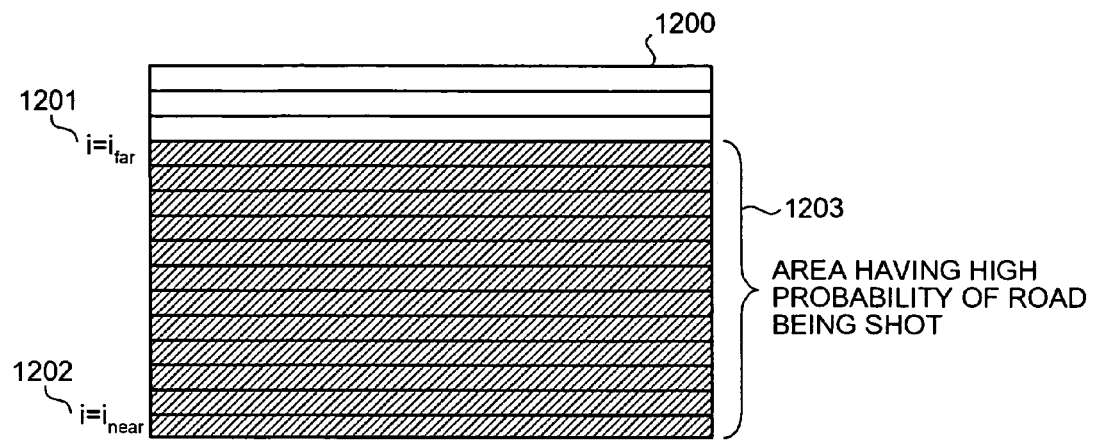
FIG. 12 is a schematic of a frame image of a roadside image shot at Step S1102.

FIG. 12 is a schematic of a frame image of the roadside image shot at step S1102. As shown in FIG. 10, a frame image 1200 includes plural areas each of which has a height of 8 pixels. A road area 1203 having a high probability of the road surface being shot is set from areas $i_{far}$ 1201 to $i_{near}$ 1202. $i_{far}$ 1201 is set sufficiently lower than an area having the height of 8 pixels in which a horizon is shot. $i_{near}$ 1202 is set in an area having the height of 8 pixels that is closest to the vehicle 401.

When an intersection judgment is performed, the intersection is judged to be present when following equation (6) and equation (7) are constantly fulfilled using an integer a (not a negative value) that fulfills a following equation (5).

$$\sum_{N=n-a+1}^{n} d(n) > R \tag{5}$$

$$D(N,I-1) > D(N,I), \forall I = i_{far}+1, \ldots, i_{near}, \forall N = n-a+1, \ldots, n \tag{6}$$

$$D(N, i_{far}) > C, \forall N = n-a+1, \ldots, n \tag{7}$$

The equation (5) is a condition allowing a travel segment of consecutive a frames to exceed a threshold value R (length of a road width assumed to be an intersecting road). The equation (6) is a condition allowing a distance to the subject to monotonically decrease from a top of a screen to a bottom of the screen. The equation (7) is a condition allowing the position of $i_{far}$ 1201 to exceed a threshold value C (a value indicating how far an intersecting road continues for the road to be judged as an intersection). Besides the conditions above, the condition indicating whether a distance to the subject from $i_{far}$ 1201 to $i_{near}$ 1202 in each frame image has sufficient flatness to be recognized as a road configuration, can be included.

When the intersection judgment is performed using the equations (5) to (7), notification of information acquired using the equations can be given to the car navigation device. The car navigation device can, for example, change the current position of the vehicle 401 to an intersection closest to the current position estimated by GPS or the speed sensor. If there is no sufficiently close intersection, the car navigation device can ignore the notification and perform ordinary processing until a next intersection notification is received.

According to the first embodiment as explained above, the roadside image of either the left side or the right side of the vehicle is shot. The optical flow is calculated and the current position is detected. Therefore, the current position can be detected without errors being accumulated unlike when the traveled distance is calculated using speed pulses. Furthermore, vehicle position can be corrected based on the detected result. An accurate positioning of the current position can be performed if the vehicle position is corrected by detecting plural spatial object repeatedly.

In the first embodiment described above, position detection of a mobile object is performed using distance records or judgment equations. However, data acquired when the frame images shot by the camera 113 are processed in advance can be used. In the second embodiment, the position detecting device 200 explained in the first embodiment detects a position of a mobile object with reference to reference side data within a map database provided in advance.

For example, a time series distance to a subject (or a time series optical flow) acquired when frame images of spatial objects shot by the camera 113 have been processed, is provided in advance as the reference side data. A distance to the subject acquired while the vehicle is currently moving can be compared with the reference side data, and the position of the vehicle can be corrected based on the best matching position.

A hardware configuration of the position detecting device according to the second embodiment of the present invention is almost the same as that in FIG. 1. An overview of detection of a current position of a vehicle according to the second embodiment is almost the same as that in FIG. 3. An installation of the camera 113 according to the second embodiment is almost the same as that in FIG. 4. A calculation of an optical flow according the second embodiment is almost the same as that in FIGS. 5A to 10. Therefore, explanations thereof are omitted.

Figure 13:
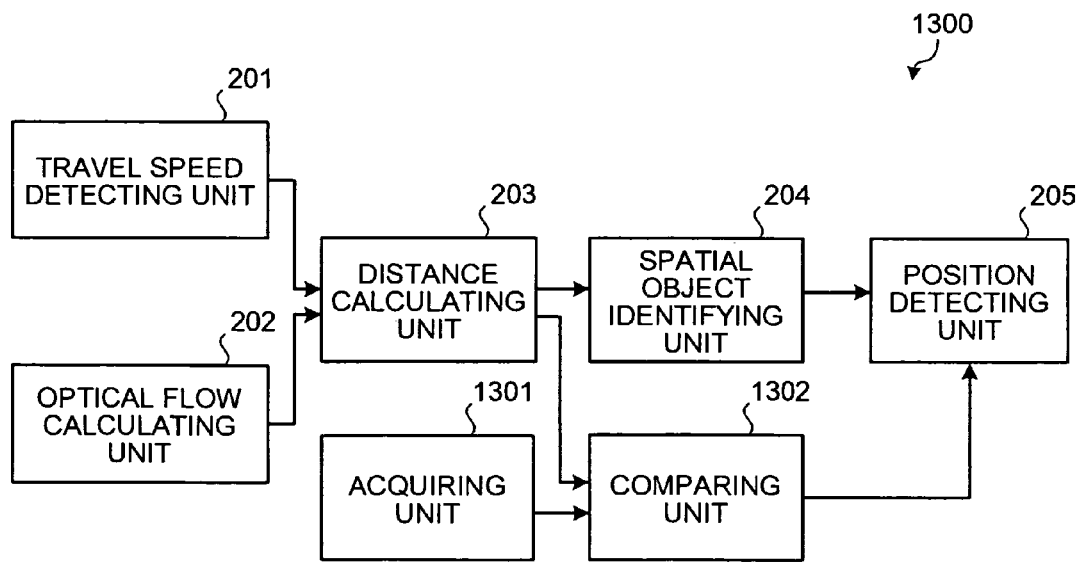
FIG. 13 is a block diagram of the position detecting device according to a second embodiment of the present invention.

FIG. 13 is a block diagram of the position detecting device according to the second embodiment of the invention. A position detecting device 1300 includes the travel speed detecting unit 201, the optical flow calculating unit 202, the distance calculating unit 203, the spatial object identifying unit 204, the position detecting unit 205, an acquiring unit 1301, and a comparing unit 1302. Components in the position detecting device 1300 according to the second embodiment having the same function as that in the position detecting device 200 according to the first embodiment are given the same reference numbers, and explanations thereof are omitted.

The acquiring unit 1301 acquires a distance to the subject on an arbitrary route from the map database. The map database can include the recording medium such as the HD 105 or the FD 107, and stores reference side data in advance that is acquired when frame images shot by the camera 113 are processed. The storage of the reference side data will be explained later with reference to FIGS. 14A and 14B.

The comparing unit 1302 compares the distance to the subject calculated by the distance calculating unit 203 and the distance to the subject calculated by the acquiring unit 1301. When the distances are compared, for example, a predetermined threshold value can be set. More specifically, a difference between the distances can be compared with the threshold value. Then, the position detecting unit 205 detects a current position of the mobile object based on a result of the comparison performed by the comparing unit 1302.

The travel speed detecting unit 201, the optical flow calculating unit 202, the distance calculating unit 203, the spatial object identifying unit 204, the position detecting unit 205, the acquiring unit 1301, and the comparing unit 1302, explained above in FIG. 13, are, for example, realized by the CPU 101 that executes a program stored in the recording medium such as the ROM 102, the RAM 103, or the HD 105, shown in FIG. 1, or by the communication I/F 109 or the image I/F 112.

Figure 14A:
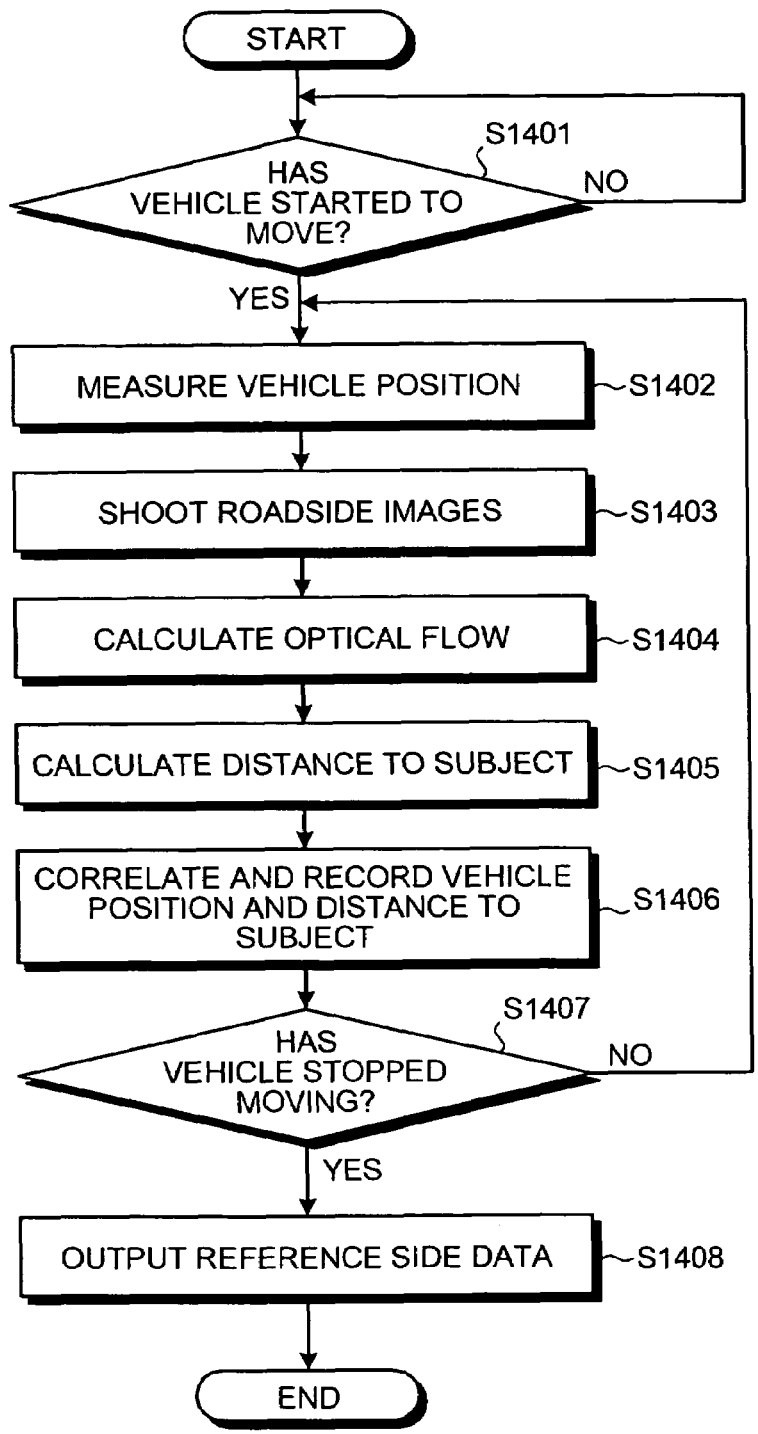
FIGS. 14A and 14B are flowcharts of a reference side data generating process.

FIG. 14A is a flowchart of a reference side data generating process. The position detecting device 1300 performs the reference side data generating process in advance. However, the process can also be performed by a device having the same functions as the position detecting device 1300.

The position detecting device 1300 judges whether the vehicle 401 has started to move (step S1401). The position detecting device 1300 judges whether the vehicle 401 has started to move based on, for example, a state of the engine key or an output from the speed sensor 111. The position detecting device 1300 waits until the vehicle starts to move. When the vehicle is moving (step S1401: YES), the position detecting device 1300 measures a vehicle position (step S1402). The position detecting device 401 measures the vehicle position, for example, by measuring latitude and longitude of an absolute position with a positioning device such as a GPS unit (not shown). In addition, the vehicle position can be acquired from an external source via the communication I/F 109.

Then, the image I/F 112 controls the camera 113 and shoot roadside images from the vehicle 401 (step S1403). The roadside images shot at step S1403 are alternately stored in the two frame buffers. Each pixel in each frame image is stored as the 8-bit, 256-gradation data. The optical flow calculating unit 202 calculates an optical flow based on the frame images stored in the frame buffers (step S1404). The optical flow calculating unit 202 calculates the optical flow, for example, by calculating 30 optical flows on the vertical line in the center of the frame image between consecutive frame images. In the explanation of FIG. 14A, the i-th optical flow from the top of the n-th frame is represented $O_F(n, i)$ 1020 as described in FIGS. 8 to 10.

Then, the distance calculating unit 203 calculates a distance to the subject based on the travel speed of the vehicle 401 detected by the travel speed detecting unit 201 and the optical flow $O_F(n, i)$ 1020 calculated at step S1404 (step S1405). The distance to the subject is determined to be $D(n, i)$ using, for example, the equation (2).

The CPU 101 controls the HDD 104 and the like, correlates the vehicle position measured at step S1402 and the distance $D(n, i)$ to the subject calculated at step S1405, and records the correlated vehicle position and the distance $D(n, i)$ in the recording medium such as the HD 105 (step S1406). When the CPU 101 performs the recording at step S1406, for example, latitude and longitude information can be attached to each item of the distance D to the subject when the traveled distance d(n) between each frame is uniformly one meter. The latitude and longitude information can be maintained for each road link.

Then, the position detecting device 200 judges whether the vehicle 401 has stopped moving (step S1407). The position detecting device 200 judges whether the vehicle has stopped moving based on, for example, a state of the engine key or an output from the speed sensor 111. When the vehicle 401 has not stopped moving (step S1407: NO), the processes are repeated from step S1402. When the vehicle 401 has stopped (step S1407: YES), the CPU 101 outputs the data recorded at step S1406 as the reference side data (step S1408), and a series of processes is finished. The CPU 101 outputs the reference side data by storing the data in the recording medium such as the HD 105, or by transmitting the data to the external device via the communication I/F 109.

Note that the processes are performed using the vehicle position measured at step S1402. However, the vehicle position can be corrected by a subsequent process to enhance accuracy. The reference side data requires updating in accordance with changes in the roadside. A map provider can periodically update and distribute the reference side data.

Figure 14B:
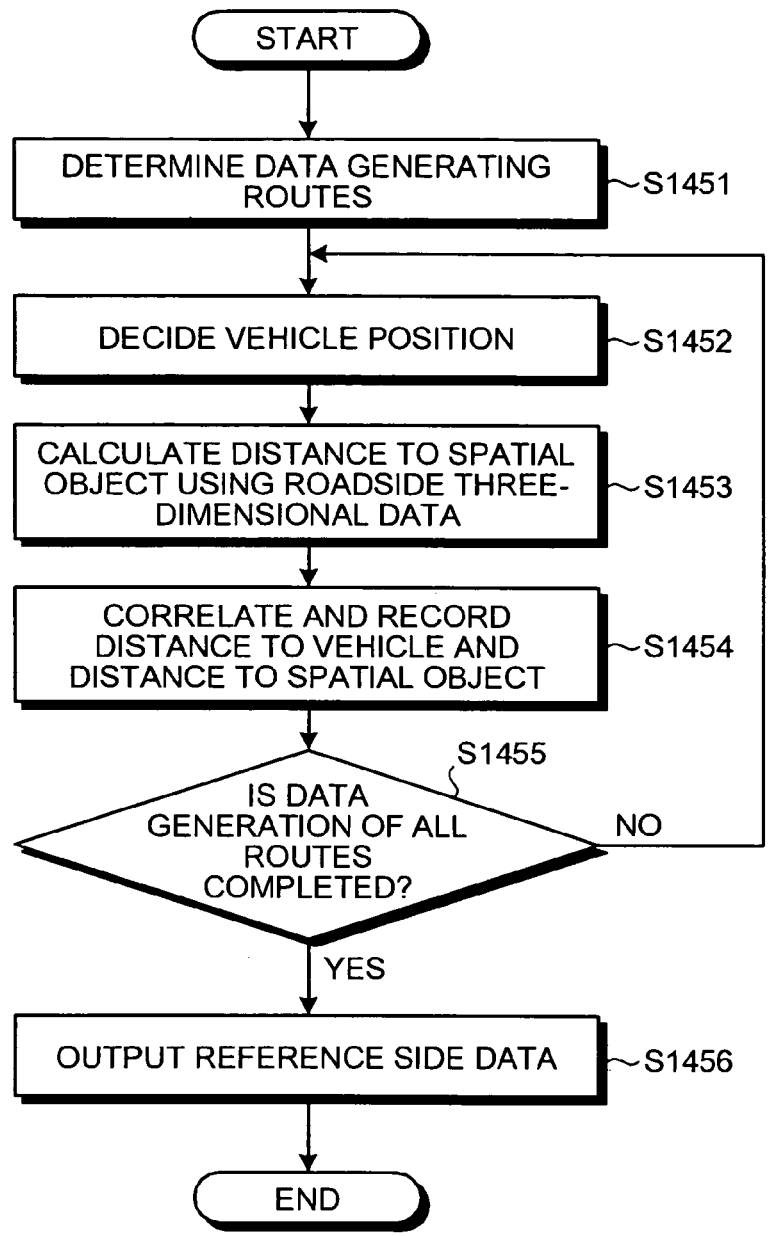

FIG. 14B is a flowchart of a reference side data generating process. Note that measurement errors related to position accuracy and a distance to a subject do not occur because data is processed.

The position detecting device 1300 determines data generating routes to generate the reference side data (step S1451). The data generating route is determined, for example, by a user operating the input device 110. Alternatively, the data generating route may be determined to a road section corresponding to a segment for which the roadside three-dimensional data is accumulated to display on the three-dimensional computer graphic (CG) display in the navigation device.

The CPU 101 determines a vehicle position on the data generating route determined at step S1451 (step S1452). The vehicle position can be determined at predetermined intervals on the data generating route.

The CPU 101 calculates a distance to the spatial object using the roadside three-dimensional data (step S1453). In addition, the CPU 101 correlates the distance to the vehicle and the distance to the spatial object, and records the correlated distances in the HD 105 and the like (step S1454).

The CPU 101 judges whether data generation of all of the data generating routes determined at step S1451 is completed (step S1455). When the data generation of all routes is not completed (step S1455: NO), the processes are repeated from step S1452. When the data generation of all routes is completed (step S1455: YES), the CPU 101 outputs the data recorded at step S1454 as the reference side data, and a series of processes is finished. The CPU 101 may store the reference side data output in the recording medium such as the HD 105, or transmit the reference side data to the external device via the communication I/F 109.

Figure 15:
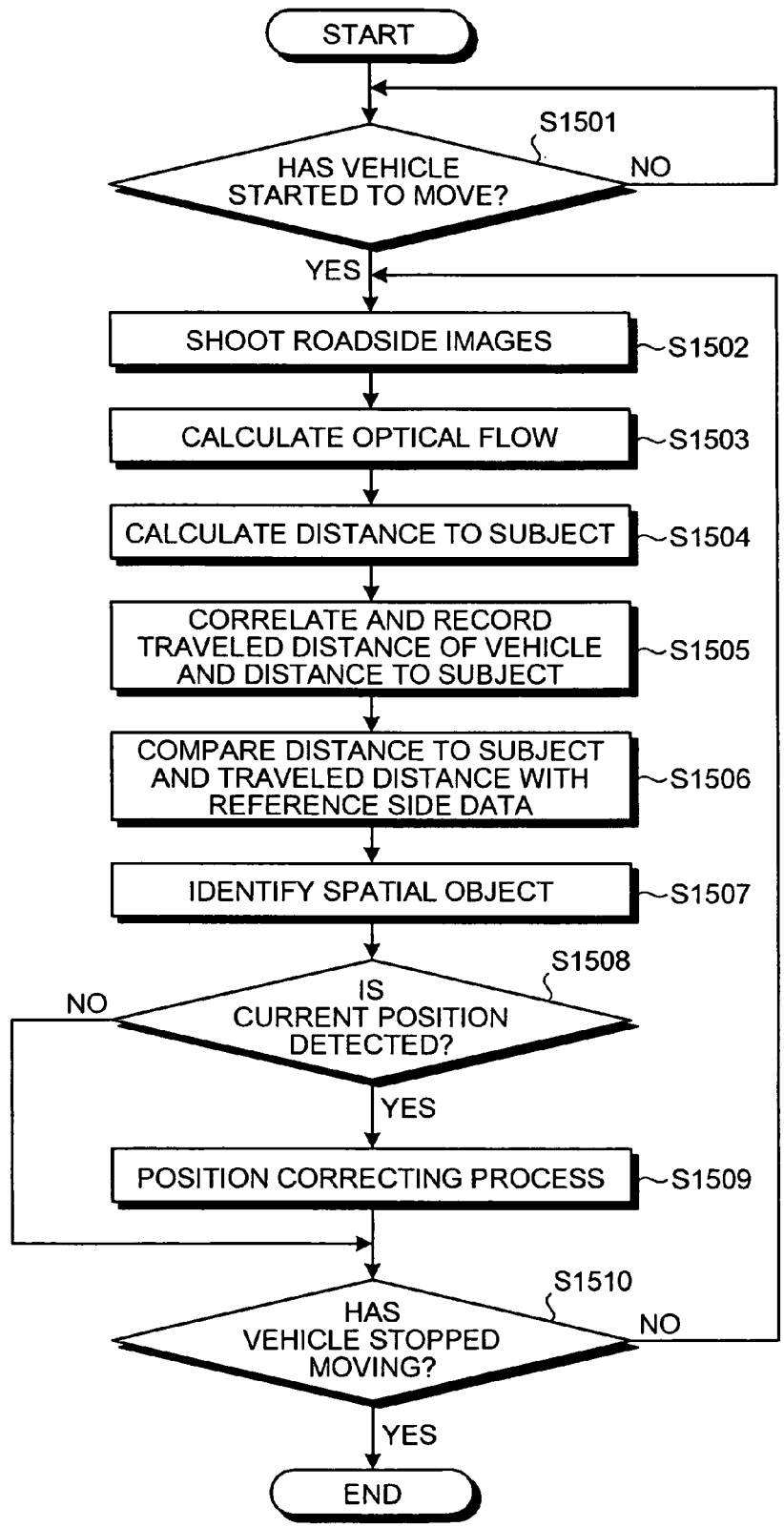
FIG. 15 is a flowchart of processes performed by the position detecting device.

FIG. 15 is a flowchart of processes performed by the position detecting device. The position detecting device 1300 judges whether the vehicle 401 has started to move (step S1501). The position detecting device 1300 judges whether the vehicle 401 has started to move based on, for example, a state of the engine key or an output from the speed sensor 111. The position detecting device 1300 waits until the vehicle starts to move. When the vehicle is moving (step S1501: YES), the image I/F 112 controls the camera 113 and shoots roadside images from the vehicle 401 (step S1502).

The roadside images shot at step S1502 are alternately stored in the two frame buffers. Each pixel in each frame image is stored as the 8-bit, 256-gradation data. The optical flow calculating unit 202 calculates the optical flow based on the frame images stored in the frame buffers (step S1503). The optical flow calculating unit 202 calculates the optical flow, for example, by calculating 30 optical flows on the vertical line in the center of the frame image between consecutive frame images. In the explanation of FIG. 15, the i-th optical flow from the top of the n-th frame is represented $O_F(n, i)$ 1020 as described in FIGS. 8 to 10.

The distance calculating unit 203 calculates a distance to the subject based on the travel speed of the vehicle 401 detected by the travel speed detecting unit 201 and the optical flow $O_F(n, i)$ 1020 calculated at step S1503 (step S1504). The distance to the subject is determined to be D(n, i), for example, using the equation (2). In addition to the calculation of the distance D(n, i) to the subject, the traveled distance d(n) of the vehicle 401 from the (n−1) frame to the current frame is calculated using the equation (4). The (n−1) frame is immediately before the current frame.

The CPU 101 controls the HDD 104 and the like, correlates traveled distance of the vehicle 401 calculated at step S1504 and the distance to the subject, and records the correlated distances in the recording medium such as the HD 105 (step S1505). At step S1505, for example, all 30 calculated distances D(n, i) to the subject and all inputs of the traveled distances d(n) between frame images can be recorded. Alternatively, the distance D(n, i) and the traveled distance d(n) can be recorded in the FIFO buffer that records only a limited amount of information or the like, and be deleted after a certain distance is traveled.

The comparing unit 1302 compares the distance D(n, i) to the subject and the traveled distance d(n) between the frame images with the reference side data (step S1506). The spatial object identifying unit 204 identifies a spatial object based on a result of the comparison performed at step S1506 (step S1507). Then, the position detecting unit 205 judges whether a current position of the vehicle 401 is detected based on the spatial object identified at step S1507 (step S1508). When the current position is detected (step S1508: YES), a position correcting process is performed on the current position of the vehicle 401 (step S1509). When the current position is not detected (step S1508: NO), the position detecting device 200 judges whether the vehicle 401 has stopped moving (step S1510).

At step S1506, for example, the reference side data of a few frames immediately before and after the distance D(n, i) to the subject can be normalized and compared with subject distance data that are uniformly one meter.

A road link in which the vehicle is moving is acquired using the positioning device or the car navigation device (not shown). The reference side data corresponding to the acquired road link is referenced. Specifically, the distance D(n, i) to the subject is compared with the reference side data, and reference side data best-matched the distance D(n, i) to the subject is identified. The latitude and longitude information recorded in the identified reference data is output to the car navigation device or the like as the current position of the vehicle 401, and the current position of the vehicle 401 is corrected.

At step S1510, when the vehicle 401 has not stopped moving (step S1510: NO), the processes are repeated from step S1502. When the vehicle 401 has stopped moving (step S1502: YES), a series of processes is finished.

According to the second embodiment as explained above, the processes are performed with the reference side data provided in advance. Therefore, data processing load on the device can be reduced and the position of the vehicle can be detected.

In the first embodiment, the position detection of the mobile object is performed using frame images from either the left side or the right side of the mobile object. In the third embodiment, the position detection of the mobile object is performed by the position detecting device 200 described in the first embodiment using frame images from both the left side and the right side of the mobile object.

A configuration of the position detecting device according to the third embodiment is almost the same as that in FIG. 1. The detection of the current position of the vehicle according to the third embodiment is almost the same as that in FIG. 3. A calculation of the optical flow according the third embodiment is almost the same as that in FIGS. 5A to 10. Therefore, explanations thereof are omitted.

A configuration of the position detecting device according to the third embodiment is almost the same as that in FIG. 2. Differences will be explained with reference to FIG. 2. As shown in FIG. 2, the optical flow calculating unit 202 calculates an optical flow of another side based on frame images from the other side of the mobile object on an arbitrary route. The other side is, for example, an opposite direction of the side of which the optical flow is calculated in the first embodiment. For example, optical flows of both sides of the mobile object can be calculated.

The distance calculating unit 203 calculates a distance to the subject on the other side of the vehicle based on the travel speed detected by the travel speed detecting unit 201 and the optical flow calculated by the optical flow calculating unit 202.

The spatial object identifying unit 204 identifies a spatial object that is the subject based on the distance to the subject on the other side calculated by the distance calculating unit 203. The spatial object identifying unit 204 can also identify a topographic feature at the current position of the mobile object based on the distance to the subject on the other side. Furthermore, the spatial object identifying unit 204 can identify a direction in which the mobile object is turning based on a difference between the distance to the subject on one side and the distance to the subject on the other side.

The position detecting unit 205 detects a current position of the mobile object based on point data of the spatial object on the other side identified by the spatial object identifying unit 204. The point data of the spatial object can be, for example, the coordinate value. The current position of the vehicle is detected at a distance of the distance to the subject from the position of the point data. The position detecting unit 205 can also detect the current position of the mobile object based on the topographical feature of the current position identified by the spatial object identifying unit 204.

Figure 16A:
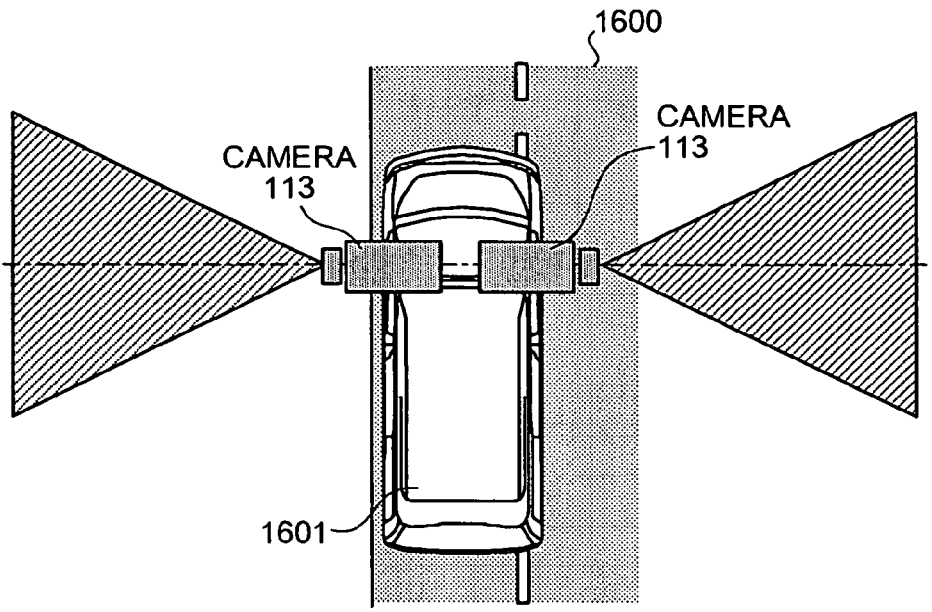
FIG. 16A is a schematic for illustrating installation of two cameras according to a third embodiment of the invention.

FIG. 16A is a schematic for illustrating installation of two cameras according to the third embodiment. Cameras 113 are installed in a vehicle 1601 traveling on an arbitrary route 1600.

The cameras 113 are installed in the directions that allow shooting from the left side and the right side of the vehicle 401. The camera 113 can shoot images in monochrome or in color, and includes the video camera or the like. The camera 113 consecutively shoots side images at intervals of several tens of frames per second. The number of frames shot per unit time is the frame rate F.

Figure 16B:
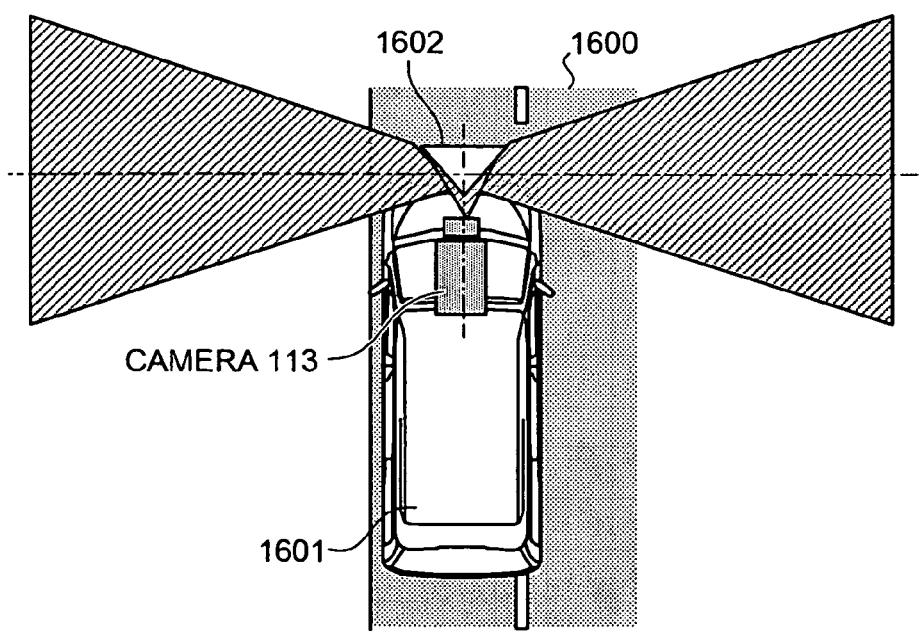
FIG. 16B is a schematic for illustrating installation of the cameras and a mirror.

FIG. 16B is a schematic for illustrating installation of the camera and a mirror. The camera 113 and a mirror 1602 are installed in the vehicle 1601 traveling on the arbitrary route 1600.

One camera 113 is installed facing the front (or the rear) of the vehicle 1601, and can shoot the left side and the right side of the vehicle 1601 using the mirror 1602. The mirror 1602 uses an optical system such as a prism. The mirror 1602 is currently used to check approaching vehicles at intersections with poor visibility.

As shown in FIGS. 16A and 16B, when the left side and the right side are shot, a current position can be detected using a difference between optical flows of the left frame image and the right frame image.

Figure 17:
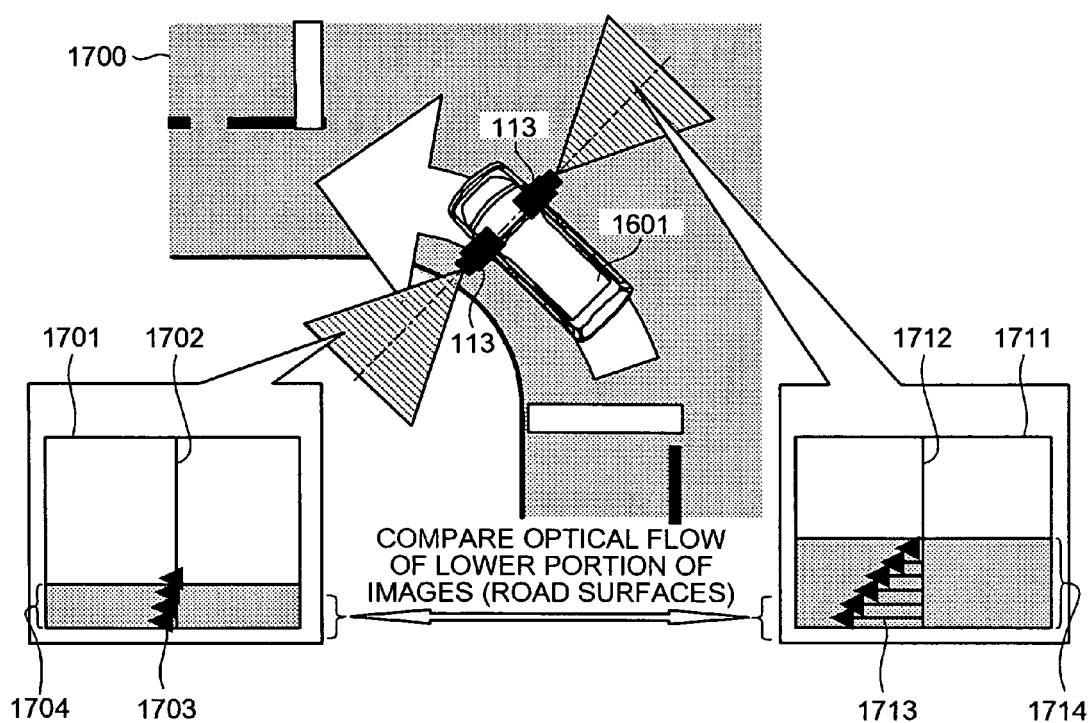
FIG. 17 is a schematic for illustrating a left turn at an intersection.

FIG. 17 is a schematic for illustrating a left turn at the intersection. Although the left turn is explained in FIG. 17, the same configuration applied to right turns. The vehicle 1601 is making a left turn at an intersection 1700. The vehicle 1601 includes the cameras 113 that shoot the left side and the right side. For example, the camera 113 installed on the left side of the vehicle 1601 shoots a left roadside image and records a left frame image 1701. The camera 113 installed on the right side of the vehicle 1601 shoots a right roadside image and records a right frame image 1711.

An optical flow 1703 is calculated for a road area 1704 on a vertical line 1702 in the center of the left frame image 1701. A road surface is shot in the road area 1704. Similarly, an optical flow 1713 is calculated for a road area 1714 on a vertical line 1712 in the center of the right frame image 1711. A road surface is shot in the road area 1714.

When the vehicle 1601 is moving straight, distances between an object and the left and right cameras 113 are almost the same. More specifically, the optical flow 1703 and the optical flow 1713 of the areas in which road surfaces are shot are almost equal in the left frame image 1701 and the right frame image 1711. When the vehicle 1601 makes a turn having a small turning radius such as at an intersection, the optical flow 1703 in the left frame image 1701 shot by the camera 113 shooting the left roadside image becomes smaller. The left roadside is a direction of a rotational center. The optical flow 1713 in the right frame image 1711 shot by the camera 113 shooting the right roadside image becomes larger compared with the optical flow 1703. The right roadside is a direction opposite of the rotational center.

The difference between the optical flow 1703 and the optical flow 1713 is generated due to the vehicle 1601 making a turn. The amount of the difference is inversely proportional to the turning radius. Therefore, using the equation (1) or the equation (3), a difference between a left road surface distance and a right road surface distance is calculated from the distance D to the subject. The road surface distances are fundamentally equidistant when the vehicle is moving straight. When the difference between the road surface distances is more than a certain amount, the vehicle 1601 is judged to have made a left turn.

Figure 18:
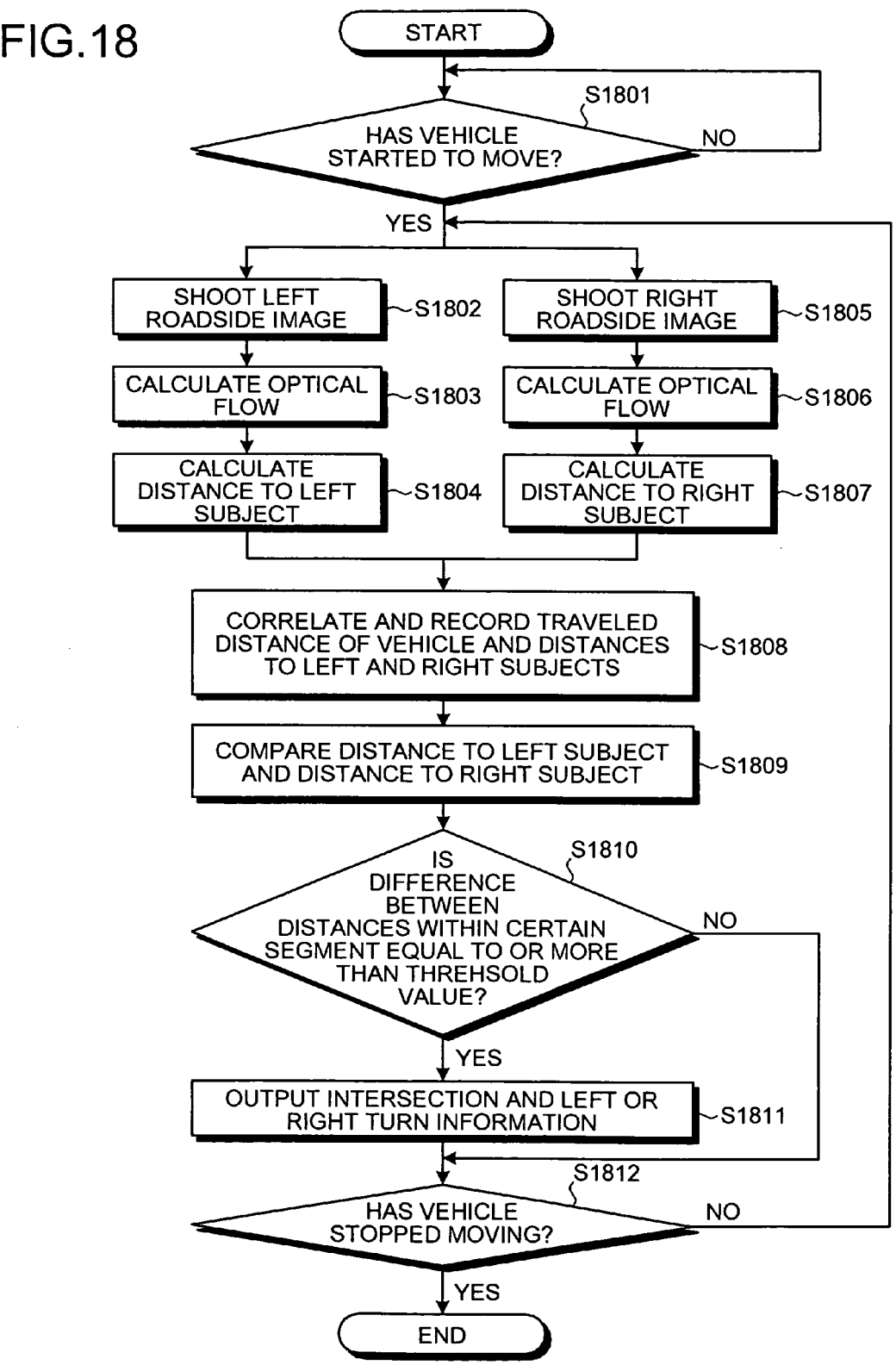
FIG. 18 is a flowchart of the processes performed by the position detecting device.

FIG. 18 is a flowchart of the processes performed by the position detecting device. The processes performed by the position detecting device 200 detect a left turn or a right turn at an intersection. The position detecting device 200 judges whether the vehicle 401 has started to move (step S1801). The position detecting device 200 waits until the vehicle starts to move. When the vehicle is moving (step S1801: YES), the image I/F 112 controls the camera 113 and shoots left roadside images from the vehicle 401 (step S1802).

The left roadside images shot at step S1802 are alternately stored in two frame buffers for the left side. Each pixel in each frame image is stored as the 8-bit, 256-gradation data. The optical flow calculating unit 202 calculates an optical flow based on the frame images stored in the frame buffers (step S1803). The optical flow calculating unit 202 calculates the optical flow, for example, by calculating 30 optical flows on the vertical line in the center of the frame image between consecutive frame images. In the explanation of FIG. 18, the i-th optical flow from the top of the n-th frame is explained as $O_F(n, i)$ 1020 as described in FIGS. 8 to 10.

The distance calculating unit 203 calculates a distance to a left subject based on the travel speed of the vehicle 401 detected by the travel speed detecting unit 201 and the optical flow $O_F(n, i)$ 1020 calculated at step S1803 (step S1804). The distance to the subject is determined to be D(n, i), for example, using the equation (2). In addition to the calculation of the distance D(n, i) to the subject, the traveled distance d(n) of the vehicle 401 from the (n−1) frame to the current frame is calculated using the equation (4). The (n−1) frame is immediately before the current frame.

The image I/F 112 controls the camera 113 and shoots right roadside images (step S1805). The optical flow calculating unit 202 calculates an optical flow (step S1806), and the distance calculating unit calculates a distance to a right subject (step S1807) in the same manner as at steps S1802 to S1804.

The CPU 101 correlates the traveled distances of the vehicle 401 calculated at steps S1804 and S1807 and the distances to the left and right subjects, and records the correlated distances in the recording medium such as the HD 105 by controlling the HDD 104 and the like (step S1808).

The spatial object identifying unit 204 compares the distance to the left subject and the distance to the right subject based on the distances D(n, i) to the left and right subjects recorded at step S1808 (step S1809). The left subject and the right subject can be, for example, the road surfaces explained in FIG. 17. The spatial object identifying unit 204 and the position detecting unit 205 judge whether a difference between the distances within a certain segment is equal to or more than a threshold value (step S1810).

When the difference is equal to or more than the threshold value (step S1810: YES), the spatial object identifying unit 204 and the position detecting unit 205 detect that the vehicle is making a left or right turn at an intersection and outputs information on the intersection and the left or right turn (step S1811). The information on the intersection and the left or right turn can be output, for example, to the car navigation device (not shown) via the communication I/F 109 to correct the current position of the vehicle. Details of the detection of the intersection and the left or right turn information will be explained later. The position detecting device 200 judges whether the vehicle 401 has stopped moving (step S1812).

When the difference is not equal to or more than the threshold value (step S1810: NO), the position detecting device 200 judges whether the vehicle 401 has stopped moving (step S1812). The judgments related to the movement of the vehicle 401 can be performed, for example, by a state of the engine key or an output from the speed sensor 111. When the vehicle 401 has not stopped moving (step S1812: NO), the processes are repeated from step S1802 or step S1805. When the vehicle 401 has stopped moving (step S1812: YES), a series of processes is finished.

Figure 19:
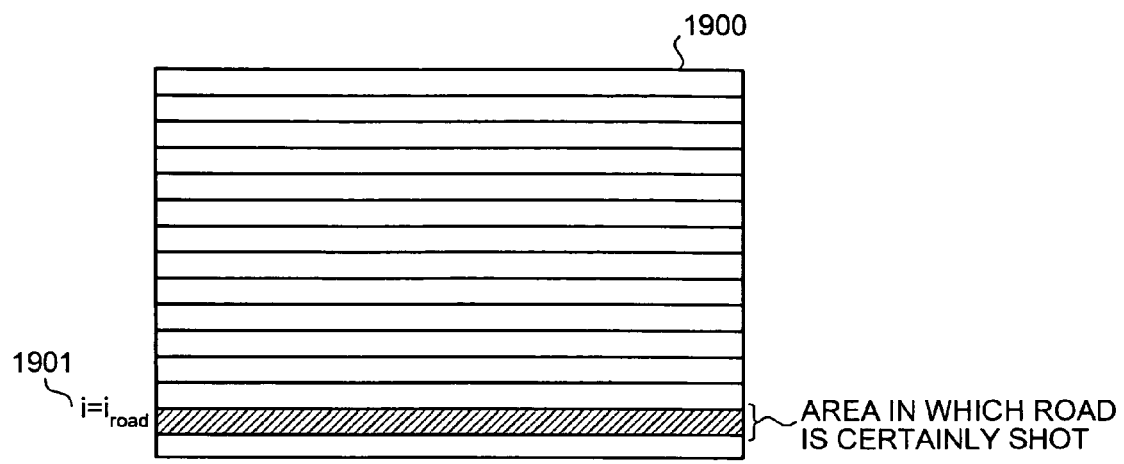
FIG. 19 is a schematic of an area in which a road is certainly shot with certainty.

The detection of the intersection and the left or right turn at steps S1809 to S1811 will be explained. FIG. 19 is a schematic of an area in which a road is certainly shot.

A frame image 1900 is the left or right roadside image shot by the camera 113 at step S1802 or step S1805. As explained in FIG. 10, the image includes plural areas having the height of 8 pixels. $i_{road}$ 1901 in the frame image 1900 is the area in which the road is certainly shot. The $i_{road}$ 1901 is set, for example, lower than an area having the height of 8 pixels in which the horizon is shot. In addition, the $i_{road}$ 1901 is set sufficiently low enough to allow the road to be shot, regardless of the vehicle making a left or a right turn.

The spatial object identifying unit 204 and the position detecting unit 205 compare the distance to the left subject and the distance to the right subject based on the distance D(n, i) to the left and right subjects recorded at step S1808, and judges the left or right turn and the intersection using the difference between the distances. The left or right turn can also be judged using the distance to the subject of one or plural $i_{road}$ 1901 in which a nearby road surface is certainly shot by the camera 113. The $i_{road}$ 1901 is the area having the height of 8 pixels.

The distance to the subject calculated at the $i_{road}$ 1901 in the frame image 1900 shot by the camera 113 that shoots the left roadside image is a distance $D_L(n, i_{road})$. The distance to the subject calculated at the $i_{road}$ 1901 in the frame image 1900 shot by the camera 113 that shoots the right roadside image is a distance $D_R(n, i_{road})$. The spatial object is judged to be the intersection when following equation (9) and equation (10) are constantly fulfilled using an integer b for at least one of the distances. The integer b fulfills a following equation (8) and is not a negative value.

$$\sum_{N=n-b+1}^{n} d(n) > T \qquad (8)$$

$$D_L(N, i_{road}) - D_R(N, i_{road}) > TL \qquad (9)$$

$$D_R(N, i_{road}) - D_L(N, i_{road}) > TR \qquad (10)$$

The equation (8) is a condition allowing a travel segment of consecutive b frames to exceed a threshold value R (a traveled distance required for a vehicle to make a left or right turn at the intersection). The equation (9) is a condition for when the left turn is made. The left turn is judged to be made when the distance $D_L(n, i_{road})$ to the subject on the left side is larger than the distance $D_R(n, i_{road})$ to the subject on the right side by a threshold value TL. Similarly, the equation (10) is a condition for when the right turn is made. The threshold value is TR. The threshold values for the left turn and the right turn differ because curvatures of the left turn and the right turn differ when the vehicle is traveling on a road with plural traffic lanes (traveling on the left side of the road or the right side of the road). The spatial object identifying unit 204 identifies the spatial object as the intersection. The position detecting unit 205 detects the position of the vehicle regarding the left or right turn at the identified intersection.

Then, when the left or right turn at the intersection is detected, a notification of the information is given to the car navigation device. The car navigation device, for example, changes the current position of the vehicle 401 to the intersection closest to the current position estimated by GPS or the speed sensor 111. Then, the car navigation device changes the current route so that the route transitions to the road link following the right turn or left turn. If a sufficiently close intersection is not present, the car navigation device can ignore the notification and perform ordinary processing until the next intersection notification is received.

According to the third embodiment as explained above, when roadside images on both left and right sides are shot, the functions explained in the first embodiment or the second embodiment can be operated independently for the left side and the right side. Therefore, when negative effects are present due to parked vehicles, other vehicles traveling alongside the vehicle, vehicles making left or right turns, and the like, and a distance to the subject on either the left side or the right side cannot be correctly calculated, the position detection can be performed using the calculation result of the other side. When an intersection is detected by the camera on one side, the spatial object can be detected as a T-intersection rather than an intersection. Therefore, the position detection can be performed more accurately. This can be advantageous when position correction is performed.

In the third embodiment, the processes are performed without using the reference side data. However, the processes can also be performed with reference to the reference side data as in the second embodiment.

The position detection method explained in the embodiments can be realized by executing a program provided in advance by a computer such as a personal computer or a work station. The program is stored on a computer-readable recording medium such as an HD, an FD, a CD-ROM, an MO disk, or a DVD, and is executed by being read from the recording medium by the computer. The program can also be a transmission medium that can be distributed via a network such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A position detecting device comprising:
    a travel speed detecting unit that detects a travel speed of a mobile object moving on an arbitrary route;
    an optical flow calculating unit that calculates an optical flow of one side of the mobile object, based on a series of frame images of the one side, wherein the one side is any one of a left side and a right side of the mobile object;
    a distance calculating unit that calculates a distance to a subject on the one side based on the travel speed and the optical flow;
    a spatial object identifying unit that identifies whether the subject is an intersection based on the distance calculated by the distance calculating unit; and
    a position detecting unit that detects a current position of the mobile object based on point data of the subject and the distance to the subject that is identified as the intersection by the spatial object identifying unit, wherein
    the spatial object identifying unit is further configured to identify the subject as the intersection when a frame image is shot in which a distance to a subject increases smoothly along a traveling direction of the mobile object and a distance to a subject equal to or more than a fixed distance continues for a distance equal to or more than a fixed distance in the traveling direction of the mobile object.

2. The position detecting device according to claim 1, further comprising:
    an acquiring unit that acquires a distance to the subject from a map database; and
    a comparing unit that compares the distance calculated by the distance calculating unit and the distance acquired by the acquiring unit, wherein
    the position detecting unit detects the current position of the mobile object based on a result of the comparing unit.

3. The position detecting device according to claim 1, wherein:
    the optical flow calculating unit calculates two optical flows of two sides of the mobile object, based on two series of frame images of the two sides, wherein the two sides are the left side and the right side of the mobile object;
    the distance calculating unit calculates a left distance to a left subject on the left side based on the travel speed and a left optical flow, and a right distance to a right subject on the right side based on the travel speed and a right optical flow, and the position detecting device further includes an identifying unit that identifies a turning direction of the mobile object based on a difference between the left distance and the right distance.

4. The position detecting device according to claim 3, wherein:
the identifying unit identifies, based on the left distance and the right distance, a topographic feature at the current position of the mobile object; and
the position detecting unit detects the current position of the mobile object based on the topographic feature.

5. A position detecting method comprising:
travel-speed-detecting a travel speed of a mobile object moving on an arbitrary route;
optical-flow-calculating an optical flow of one side of the mobile object, based on a series of frame images of the one side, wherein the one side is any one of a left side and a right side of the mobile object;
distance-calculating a distance to a subject on the one side based on the travel speed and the optical flow;
identifying whether the subject is an intersection based on the distance calculated by the distance-calculating; and
position-detecting a current position of the mobile object based on point data of the subject and the distance to the subject that is identified as the intersection by the identifying, wherein
the identifying includes identifying the subject as the intersection when a frame image is shot in which a distance to a subject increases smoothly along a traveling direction of the mobile object and a distance to a subject equal to or more than a fixed distance continues for a distance equal to or more than a fixed distance in the traveling direction of the mobile object.

6. The position detecting method according to claim 5, further comprising:
acquiring a distance to the subject from a map database; and
comparing the distance calculated at the distance-calculating and the distance acquired at the acquiring, wherein
the position-detecting includes detecting the current position of the mobile object based on a result of the comparing.

7. The position detecting method according to claim 5, wherein:
the optical-flow-calculating includes calculating two optical flows of two sides of the mobile object, based on two series of frame images of the two sides, wherein the two sides are the left side and the right side of the mobile object;
the distance-calculating-unit includes calculating a left distance to a left subject on the left side based on the travel speed and a left optical flow, and a right distance to a right subject on the right side based on the travel speed and a right optical flow, and
the position detecting method further includes identifying a turning direction of the mobile object based on a difference between the left distance and the right distance.

8. A computer-readable recording medium that stores therein a computer program for detecting a position, the computer program causing a computer to execute:
travel-speed-detecting a travel speed of a mobile object moving on an arbitrary route;
optical-flow-calculating an optical flow of one side of the mobile object, based on a series of frame images of the one side, wherein the one side is any one of a left side and a right side of the mobile object;
distance-calculating a distance to a subject on the one side based on the travel speed and the optical flow;
identifying whether the subject is an intersection based on the distance calculated by the distance-calculating; and
position-detecting a current position of the mobile object based on point data of the subject and the distance to the subject that is identified as the intersection by the identifying, wherein
the identifying includes identifying the subject as the intersection when a frame image is shot in which a distance to a subject increases smoothly along a traveling direction of the mobile object and a distance to a subject equal to or more than a fixed distance continues for a distance equal to or more than a fixed distance in the traveling direction of the mobile object.

9. The computer-readable recording medium according to claim 8, the computer program further causes the computer to execute:
acquiring a distance to the subject from a map database; and
comparing the distance calculated at the distance-calculating and the distance acquired at the acquiring, wherein
the position-detecting includes detecting the current position of the mobile object based on a result of the comparing.

10. The computer-readable recording medium according to claim 8, wherein
the optical-flow-calculating includes calculating two optical flows of two sides of the mobile object, based on two series of frame images of the two sides, wherein the two sides are the left side and the right side of the mobile object;
the distance-calculating-unit includes calculating a left distance to a left subject on the left side based on the travel speed and a left optical flow, and a right distance to a right subject on the right side based on the travel speed and a right optical flow, and
the position detecting method further includes identifying a turning direction of the mobile object based on a difference between the left distance and the right distance.

* * * * *